US010508330B2

(12) United States Patent
Tokuda

(10) Patent No.: US 10,508,330 B2
(45) Date of Patent: Dec. 17, 2019

(54) QUASICRYSTAL-CONTAINING PLATED STEEL SHEET AND METHOD FOR PRODUCING QUASICRYSTAL-CONTAINING PLATED STEEL SHEET

(71) Applicant: NIPPON STEEL & SUMITOMO METAL CORPORATION, Tokyo (JP)

(72) Inventor: Kohei Tokuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 304 days.

(21) Appl. No.: 15/508,664

(22) PCT Filed: Sep. 5, 2014

(86) PCT No.: PCT/JP2014/073494
§ 371 (c)(1),
(2) Date: Mar. 3, 2017

(87) PCT Pub. No.: WO2016/035200
PCT Pub. Date: Mar. 10, 2016

(65) Prior Publication Data
US 2018/0171460 A1   Jun. 21, 2018

(51) Int. Cl.
*C23C 2/06* (2006.01)
*C23C 2/04* (2006.01)
(Continued)

(52) U.S. Cl.
CPC .............. *C23C 2/06* (2013.01); *B32B 15/012* (2013.01); *B32B 15/013* (2013.01); *B32B 15/04* (2013.01);
(Continued)

(58) Field of Classification Search
CPC .... C23C 2/04; C23C 2/06; C23C 2/28; C23C 2/40; C23C 2/26; C23C 28/021;
(Continued)

(56) References Cited

U.S. PATENT DOCUMENTS 10,232,589 B2 *   3/2019   Tokuda ..................... C23C 2/06
10,232,590 B2 *   3/2019   Tokuda ..................... C23C 2/06
(Continued)

FOREIGN PATENT DOCUMENTS

CN    101636517 A    1/2010
EP    3124642 A1    2/2017
(Continued)

OTHER PUBLICATIONS

Extended European Search Report dated Mar. 19, 2018 for corresponding European Application No. 14901411.0.
(Continued)

*Primary Examiner* — Michael E. La Villa
(74) *Attorney, Agent, or Firm* — Birch, Stewart, Kolasch & Birch, LLP

(57) ABSTRACT

A quasicrystal-containing plated steel sheet including: a plating layer positioned on at least one surface of a steel sheet; and an alloy layer positioned at an interface between the plating layer and the steel sheet and composed of an Al—Fe intermetallic compound. A chemical composition of the plating layer contains at least, in atom %, Zn: 28.5% to 50%, Al: 0.3% to 12%, and the balance: Mg and impurities, and the plating layer includes, in order from the steel sheet side, a first plating layer which is composed of a structure containing an MgZn phase, an Mg phase, and a quasicrystal phase, and a second plating layer which is positioned on the first plating layer and is composed of a structure containing an $Mg_{51}Zn_{20}$ phase, a Zn phase, and a quasicrystal phase.

11 Claims, 6 Drawing Sheets

(51) Int. Cl.
*C23C 2/40* (2006.01)
*C23C 2/28* (2006.01)
*B32B 15/01* (2006.01)
*B32B 15/18* (2006.01)
*C22C 23/04* (2006.01)
*C22C 30/06* (2006.01)
*C23C 2/26* (2006.01)
*C22C 23/02* (2006.01)
*C23C 28/02* (2006.01)
*C23C 30/00* (2006.01)
*C22C 23/00* (2006.01)
*B32B 15/04* (2006.01)

(52) U.S. Cl.
CPC ............ *B32B 15/043* (2013.01); *B32B 15/18* (2013.01); *C22C 23/00* (2013.01); *C22C 23/02* (2013.01); *C22C 23/04* (2013.01); *C22C 30/06* (2013.01); *C23C 2/04* (2013.01); *C23C 2/26* (2013.01); *C23C 2/28* (2013.01); *C23C 2/40* (2013.01); *C23C 28/021* (2013.01); *C23C 28/023* (2013.01); *C23C 28/025* (2013.01); *C23C 30/00* (2013.01); *C23C 30/005* (2013.01); *Y10T 428/12729* (2015.01); *Y10T 428/12757* (2015.01); *Y10T 428/12799* (2015.01); *Y10T 428/12958* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01); *Y10T 428/24975* (2015.01); *Y10T 428/263* (2015.01); *Y10T 428/264* (2015.01); *Y10T 428/265* (2015.01)

(58) Field of Classification Search
CPC ..... C23C 28/023; C23C 28/025; C23C 30/00; C23C 30/005; C23C 23/00; C23C 23/02; C22C 30/06; C22C 23/04; C22C 23/00; C22C 23/02; B32B 15/013; B32B 15/18; B32B 15/012; B32B 15/04; B32B 15/043; Y10T 428/2495; Y10T 428/24967; Y10T 428/24975; Y10T 428/263; Y10T 428/264; Y10T 428/265; Y10T 428/12729; Y10T 428/12799; Y10T 428/12757; Y10T 428/12958; Y10T 428/12972; Y10T 428/12979; Y10T 428/12993

See application file for complete search history.

(56) References Cited

U.S. PATENT DOCUMENTS

2010/0018612 A1 1/2010 Tokuda et al.
2011/0159313 A1 6/2011 Kasukawa et al.

FOREIGN PATENT DOCUMENTS

| | | |
|---|---|---|
| EP | 3124643 A1 | 2/2017 |
| JP | 4-52284 A | 2/1992 |
| JP | 8-176762 A | 7/1996 |
| JP | 2001-355055 A | 12/2001 |
| JP | 2004-267878 A | 9/2004 |
| JP | 2005-113235 A | 4/2005 |
| JP | 2007-525596 A | 9/2007 |
| JP | 2008-69438 A | 3/2008 |
| JP | 2008-255464 A | 10/2008 |
| JP | 2011-190507 A | 9/2011 |
| WO | WO 2008/111688 A1 | 9/2008 |
| WO | WO 2012/165838 A2 | 12/2012 |

OTHER PUBLICATIONS

International Search Report for PCT/JP2014/073494 dated Nov. 25, 2014.
Office Action for TW 103130767 dated Aug. 13, 2015.
Written Opinion of the International Searching Authority for PCT/JP2014/073494 (PCT/ISA/237) dated Nov. 25, 2014.
Chinese Office Action dated Jun. 6, 2018 for corresponding Chinese Patent Application 201480081739.8.
Indian Office Action and Search Report, dated Jan. 11, 2019, for corresponding Indian Application No. 201717006839, with an English translation.
Indonesian Office Action for corresponding Indonesian Application No. P00201701972, dated Sep. 19, 2019, with partial English translation.

* cited by examiner

QUASICRYSTAL-CONTAINING PLATED STEEL SHEET AND METHOD FOR PRODUCING QUASICRYSTAL-CONTAINING PLATED STEEL SHEET

TECHNICAL FIELD

The present invention relates to a quasicrystal-containing plated steel sheet and a method for producing a quasicrystal-containing plated steel sheet.

BACKGROUND ART

In general, a plated steel sheet is used for an outer plate of an automobile from the viewpoint of rust-proofing property, and an alloyed-zinc-plated steel sheet is mainly employed. The alloyed-zinc-plated steel sheet is a plated steel sheet whose weldability and corrosion resistance after coating are improved by performing an alloying treatment on a steel sheet subjected to zinc plating and causing Fe to be diffused from the steel sheet (the base steel sheet) into a plating layer. Meanwhile, in the case of the alloyed-zinc-plated steel sheet, the plating layer becomes harder due to the diffusion of Fe from the base steel sheet so that the plating layer is easily peeled off and there are also peculiar problems, which are not observed in a soft hot-dip zinc-plated steel sheet, such as powdering and flaking.

Regarding the plated steel sheet with a hard plating layer, the plating layer is easily cracked by an external pressure. Once cracks occur, the cracks are propagated to an interface between the plating layer and the base steel sheet, and thus the plating layer is peeled off from the interface and then dropped off. For example, when the alloyed-zinc-plated steel sheet is used for an outer plate of an automobile, coating and the plating layer are simultaneously peeled off by chipping due to striking of stones while the vehicle is moving, the base steel sheet is easily exposed, and thus corrosion becomes severe as compared to the soft plated steel sheet that is not alloyed, which is called chipping resistance decreasing.

In this regard, in order to improve chipping resistance of the outer plate of the automobile, it is preferable to use a plated steel sheet which has sufficient sacrificial corrosion resistance and includes a plating layer having high corrosion resistance against corrosion from a chipping portion is sufficiently suppressed as an outer plate. Simply, in order to improve chipping property, it is an easy way to use a soft plating layer, hot-dip Zn-plated steel sheet, or electro plated Zn-steel sheet; however, these plated steel sheets are rapidly corroded when a painted layer-peeled-off portion is generated by chipping. For this reason, these plated steel sheets are not fundamental solutions for chipping corrosion. When corrosion of the plated steel sheet progresses, a pitting corrosion portion becomes too larger, and result in red rust is generated from the center portion.

For example, as a plated steel sheet excellent in corrosion resistance, Patent Literature 1 discloses a Zn—Al—Mg—Si plated steel sheet and Patent Literature 2 discloses a hot-dip Zn—Mg-based alloy plated steel sheet. The plated steel sheet as described in Patent Literature 1 in which corrosion resistance is increased by adding various alloy elements such as Al, Mg, and Si to a plating layer is a Zn-based plated steel sheet. A chipping portion is less generated in a relatively soft plating layer, but when the chipping portion or coating-peeled-off portion is generated, pitting corrosion rapidly progresses as was expected. When corrosion progresses, red rust is generated from the center portion as was expected, and thus sufficient sacrificial corrosion protection property is not obtained. For these reasons, it cannot be said that the plated steel sheet in which corrosion resistance is improved on the basis of Patent Literature 1 has sufficient chipping resistance.

As a means for solving the above-described problems, there is a Zn—Mg-based alloy plated steel sheet as described in Patent Literature 2. Since a large amount of Mg is contained in the plating layer, sacrificial corrosion protection performance is sufficient, and even when pitting corrosion progresses, this plated steel sheet is an effective plated steel sheet in which red rust is not generated for a long period of time. However, in the plated steel sheet described in Patent Literature 2, $Zn_3Mg_7$ is originally formed in the plating layer to extremely increase hardness and too many pitting corrosion portions are generated so that chipping resistance is significantly decreased.

In this regard, in order to achieve the balance between corrosion resistance and chipping resistance, a means for configuring the plating layer with a plurality of layers and compositing the plurality of layers has been proposed. For example, Patent Literature 3 discloses a method for forming a hard Mg—Al alloy plating layer having high corrosion resistance on the surface of a soft low-alloy plating layer (an alloyed-zinc plating layer) formed on a steel sheet by an ion plating method. When the plating layer is multi-layered by laminating a soft low-alloy plating layer and a hard Mg—Al alloy plating layer having high corrosion resistance, there is a possibility that the balance between corrosion resistance and chipping resistance can be achieved. However, actually, since the low-alloy plating layer serving as a base layer of the plating layer is a simple alloyed-zinc plating layer, the plated steel sheet is inferior to the alloy plated steel sheets described in Patent Literature 1 and Patent Literature 2 in corrosion resistance. Further, in order to obtain corrosion resistance similar to corrosion resistance described in Patent Literatures 1 and 2 in the plated steel sheet in which the plating layer is multi-layered as disclosed in Patent Literature 3, it is necessary to considerably increase the thickness of the Mg—Al alloy plating layer of an upper layer formed by ion plating. However, it is difficult to produce a plated steel sheet with high corrosion resistance and excellent chipping resistance by the method of increasing the thickness through the ion plating method. In addition, it is necessary to provide a two-step process of alloyed-zinc plating and ion plating, and thus there is also a problem of an increase in cost.

As described above, hitherto, a means for achieving the balance between corrosion resistance and chipping resistance has not been disclosed in the alloy-based plated steel sheet which is added with a relatively large amount of alloy in order to improve corrosion resistance.

Incidentally, the quasicrystal is a crystal structure first found by Daniel Shechtman in 1982 and has icosahedron atomic arrangement. This crystal structure is an aperiodic crystal structure having a peculiar revolution symmetry (for example, fivefold symmetry) that is not obtained in general metal and alloy and is known as a crystal structure equivalent to an aperiodic structure typified by a three-dimensional Penrose pattern.

Since finding of the new arrangement of metal atoms (that is, the new crystal structure), a quasicrystal having a quasi-periodic structure and a peculiar revolution symmetry has been attracting attention. In recent years, it is found out that the quasicrystal can be obtained by crystal growth, but hitherto, the method for producing a quasicrystal is generally a liquid quenching method. For this reason, the shape of the quasicrystal is limited to powder, foil, small pieces, and thus there are remarkably few practical examples of products using the quasicrystal.

Patent Literature 4 and Patent Literature 5 disclose a high strength Mg-based alloy and a production method therefor. These Mg-based alloys are alloys which are obtained by dispersing and precipitating a hard quasicrystal phase having a particle size of several tens of nm to several hundreds of nm in a metallic structure and are excellent in strength and elongation. In these Patent Literature 4 and Patent Literature 5, the feature that the quasicrystal is hard is utilized.

Further, Patent Literature 6 discloses a thermoelectric material using an Al-based quasicrystal. In this Patent Literature 6, the feature that the quasicrystal is excellent in thermoelectric property is utilized. Patent Literature 7 discloses a heat-resistant catalyst prepared by using a quasicrystal Al alloy (an Al-based quasicrystal) as a precursor and a production method therefor. In this Patent Literature 7, the feature that the quasicrystal having no periodic crystal structure is brittle and is easily crushed is utilized. As such, in the inventions of the related arts, in many cases, the quasicrystals are dispersed as fine particles or the quasicrystals that are fine particles are solidified and molded.

As a utilization form separate from these inventions, Patent Literature 8 discloses metal coating for a utensil for cooking food products, the coating containing a quasicrystal. In this Patent Literature 8, coating that is excellent in abrasion resistance and corrosion resistance to a dietary salt is applied to a utensil for cooking food products by plasma spraying alloy powder containing a quasicrystal, which is consisting of Al, Fe, and Cr and is excellent in corrosion resistance.

As described above, the Mg-based quasicrystal is used as a material excellent in strength and the Al-based quasicrystal is used as a member excellent in strength, a thermoelectric material, coating for a utensil for cooking food products, or the like. However, these utilizations are limited and it cannot necessarily be said that the quasicrystal is used in various fields.

The quasicrystal has an excellent performance derived from a unique crystal structure. However, this characteristic is only partially revealed, and thus currently, it cannot be said that the quasicrystal is a material widely used in industrial fields. The present inventor attempted to apply a quasicrystal, which has not been industrially used yet, to a plating layer of a plated steel sheet and to improve both of corrosion resistance and chipping resistance.

CITATION LIST

Patent Literature

Patent Literature 1: JP 2001-355055A
Patent Literature 2: JP 2008-255464A
Patent Literature 3: JP H04-52284A
Patent Literature 4: JP 2005-113235A
Patent Literature 5: JP 2008-69438A
Patent Literature 6: JP H08-176762A
Patent Literature 7: JP 2004-267878A
Patent Literature 8: JP 2007-525596T

SUMMARY OF INVENTION

Technical Problem

The present invention has been made in view of the above-described circumstances, and an object thereof is intended to provide a quasicrystal-containing plated steel sheet having a good balance between corrosion resistance and chipping resistance and a method for producing a quasicrystal-containing plated steel sheet.

Solution to Problem

The present inventor has examined making a plating layer have a structure in which a plurality of layers each having a different property are laminated as a means for obtaining favorable chipping resistance in a Zn—Mg-based alloy plated steel sheet. As a result, it is found out that when a layer at the surface layer side in the plating layer having a laminate structure has a largely different property from that of a layer at the inner side of the plating layer, cracks on the surface layer of the plating layer caused by an external pressure from the surface layer of the plating layer are less likely to develop to the inside and chipping resistance is significantly improved.

Further, it is found out that corrosion resistance is improved by containing Al in the plating layer and growing a quasicrystal phase and a quasicrystal-containing plated steel sheet capable of achieving a higher level of balance between corrosion resistance and chipping resistance can be realized by forming an alloy layer at an interface between the plating layer and the base steel sheet in addition to the plurality of layers.

Furthermore, regarding a method for producing a quasicrystal-containing plated steel sheet, it is found out that a plating layer is formed by using plating with a Zn—Mg-based alloy in a molten state and then the plating layer is heated at a predetermined temperature range and held for a certain period of time. According to such a method, the plating layer can be separated into two layers of a relatively soft layer formed from fine crystal grains and a dendritic hard layer positioned inside the plating layer and it is possible to produce a quasicrystal-containing plated steel sheet having the above-described characteristics at low costs.

The present invention has been made on the basis of the findings described above, and has the following gist.

(1)

A quasicrystal-containing plated steel sheet including:

a plating layer positioned on at least one surface of a steel sheet; and an alloy layer positioned at an interface between the plating layer and the steel sheet and composed of an Al—Fe intermetallic compound, wherein a chemical composition of the plating layer contains, in atom %, Zn: 28.5% to 50%,
Al: 0.3% to 12%,
La: 0% to 3.5%,
Ce: 0% to 3.5%,
Y: 0% to 3.5%,
Ca: 0% to 3.5%,
Sr: 0% to 0.5%,
Si: 0% to 0.5%,
Ti: 0% to 0.5%,
Cr: 0% to 0.5%,
Fe: 0% to 2%,
Co: 0% to 0.5%,
Ni: 0% to 0.5%,
V: 0% to 0.5%,
Nb: 0% to 0.5%,
Cu: 0% to 0.5%,
Sn: 0% to 0.5%, Mn: 0% to 0.2%,
Sb: 0% to 0.5%,
Pb: 0% to 0.5%, and
the balance: Mg and impurities, and
the plating layer includes, in order from the steel sheet side,
a first plating layer which is composed of a structure containing an MgZn phase, an Mg phase, and a quasicrystal phase, and
a second plating layer which is positioned on the first plating layer and is composed of a structure containing an $Mg_{51}Zn_{20}$ phase, a Zn phase, and a quasicrystal phase.

(2)

The quasicrystal-containing plated steel sheet according to (1),
wherein a chemical composition of the plating layer contains, in atom %,
Zn: 32% to 40%,
Al: 2% to 5%,
Ca: 1% to 2.5%, and
the balance: Mg and impurities,
the chemical composition satisfies
Zn/Al=7.5 to 18 and
Ca/Al=0.4 to 1.1, and
a maximum grain size of the second plating layer is 1 μm or less in terms of circle equivalent diameter.

(3)

The quasicrystal-containing plated steel sheet according to (1) or (2),
wherein when the plating layer is viewed in a cross section in which a sheet thickness direction and a cutting direction are parallel to each other,
the MgZn phase of the first plating layer is configured by crystal grains having a circle equivalent diameter of 1 μm or more, and
the quasicrystal phase of the first plating layer is configured by a structure grown along the sheet thickness direction.

(4)

The quasicrystal-containing plated steel sheet according to any one of (1) to (3), wherein when the plating layer is viewed in a cross section in which a sheet thickness direction and a cutting direction are parallel to each other,
an area of a structure in which the maximum grain size of the second plating layer is 1 μm or less in terms of circle equivalent diameter is 90% or more with respect to a cross-sectional area of the entire second plating layer.

(5)

The quasicrystal-containing plated steel sheet according to any one of (1) to (4), wherein when the plating layer is viewed in a cross section in which a sheet thickness direction and a cutting direction are parallel to each other,
an area of the MgZn phase of the first plating layer is 10% to 70% with respect to a cross-sectional area of the entire first plating layer.

(6)

The quasicrystal-containing plated steel sheet according to any one of (1) to (5), wherein the second plating layer does not contain an Mg phase.

(7)

The quasicrystal-containing plated steel sheet according to any one of (1) to (6), wherein an average value of Vickers hardness of the second plating layer is 250 to 350 Hv.

(8)

The quasicrystal-containing plated steel sheet according to any one of (1) to (7),
wherein the alloy layer contains at least any of $Fe_5Al_2$ and $Al_{32}Fe$ as the Al—Fe intermetallic compound, and
a thickness of the alloy layer is 10 nm to 200 nm.

(9)

A method for producing a quasicrystal-containing plated steel sheet, the method including:
a plating step of disposing a plating alloy in a molten state on at least one surface of a steel sheet, a chemical composition of the plating alloy containing, in atom %,
Zn: 28.5% to 50%,
Al: 0.3% to 12%,
La: 0% to 3.5%,
Ce: 0% to 3.5%,
Y: 0% to 3.5%,
Ca: 0% to 3.5%,
Sr: 0% to 0.5%,
Si: 0% to 0.5%,
Ti: 0% to 0.5%,
Cr: 0% to 0.5%,
Fe: 0% to 2%,
Co: 0% to 0.5%,
Ni: 0% to 0.5%,
V: 0% to 0.5%,
Nb: 0% to 0.5%,
Cu: 0% to 0.5%,
Sn: 0% to 0.5%,
Mn: 0% to 0.2%,
Sb: 0% to 0.5%,
Pb: 0% to 0.5%, and
the balance: Mg and impurities;
a first cooling step of cooling the plating alloy in a molten state to a temperature range of 330° C. or lower at an average cooling rate of 10° C./sec or less to form a plating layer on the surface of the steel sheet;
a temperature increasing and holding step of increasing a temperature of the plating layer into a temperature range of 350° C. to 400° C. at a temperature increasing rate range of 10 to 50° C./sec after the first cooling step and holding the temperature for 5 to 30 seconds; and
a second cooling step of cooling the plating layer at a cooling rate of 20° C./sec or more after the temperature increasing and holding step.

(10)

The method for producing a quasicrystal-containing plated steel sheet according to (9),
wherein the plating step is performed by a hot-dip plating method, and
after the steel sheet is pulled up from a hot-dip plating bath, the first cooling step is continuously performed.

(11)

The method for producing a quasicrystal-containing plated steel sheet according to (9) or (10),
wherein a chemical composition of the plating alloy in a molten state contains, in atom %,
Zn: 32% to 40%,
Al: 2% to 5%,
Ca: 1% to 2.5%, and
the balance: Mg and impurities, and
the chemical composition satisfies
Zn/Al=7.5 to 18 and
Ca/Al=0.4 to 1.1.

Advantageous Effects of Invention

According to the present invention as described above, it is possible to provide a quasicrystal-containing plated steel sheet excellent in both of corrosion resistance and chipping resistance as compared to a hot-dip Zn—Mg-based alloy plated steel sheet of the related art.

Further, the quasicrystal-containing plated steel sheet according to the present invention can be suitably used for building materials, home electrical appliance members, members relating to the energy field, and the like in addition to automobile members requiring excellent chipping resistance property, and can contribute to industrial development owing to enhanced life-spans of those members, reduced maintenance effort, reduced cost, and the like.

DESCRIPTION OF EMBODIMENTS

Figure 1:
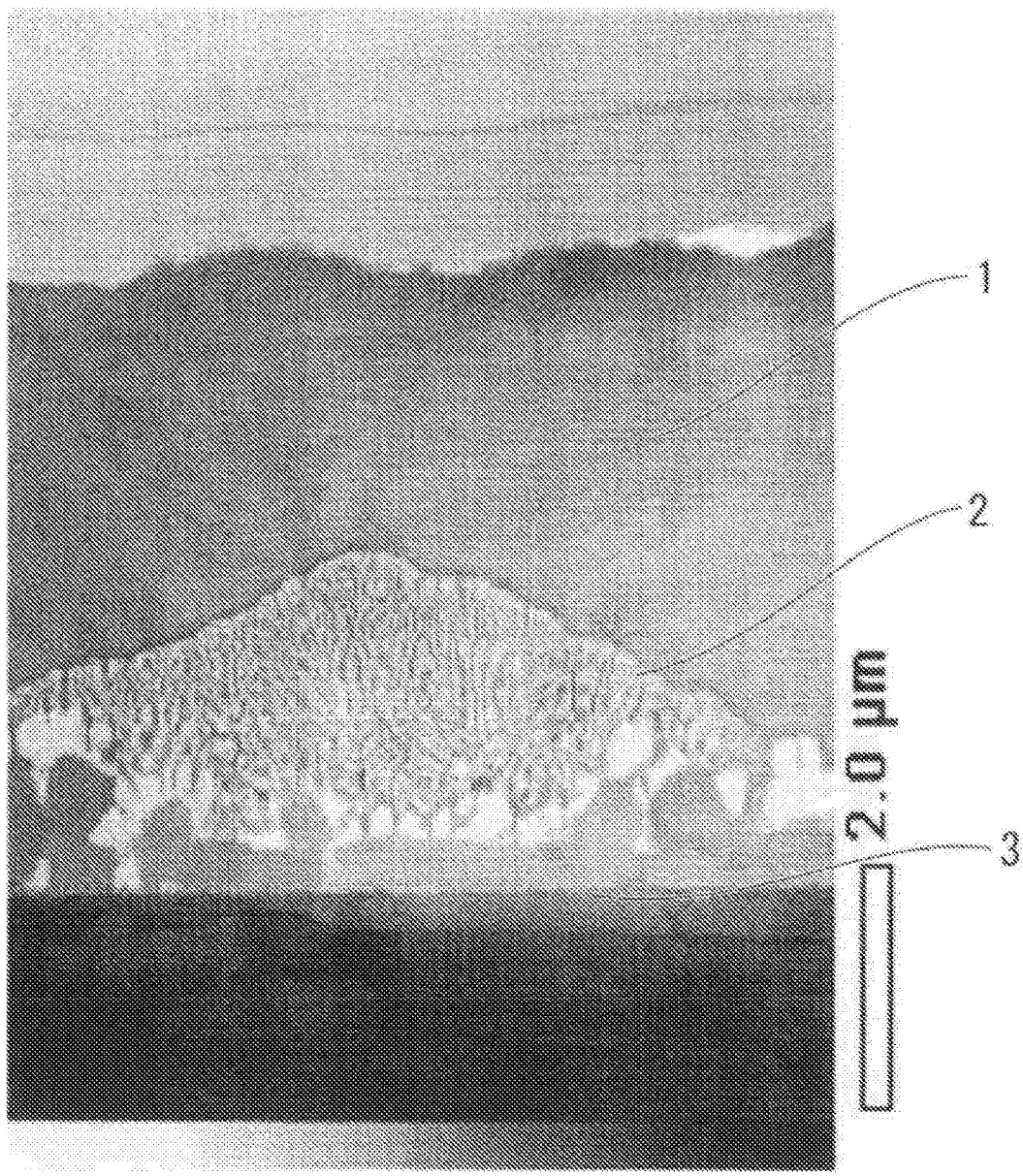
FIG. 1 shows an example of a cross-sectional structure photograph (a TEM image) of a plating layer according to an embodiment of the present invention.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

(Regarding Quasicrystal-Containing Plated Steel Sheet)

One of features of a quasicrystal-containing plated steel sheet according to the present invention is that a plating layer having a specific chemical composition has a specific structure configuration and the plating layer is formed on the surface of a base steel sheet (hereinafter, also simply referred to as "steel sheet").

Hereinafter, first, a quasicrystal-containing plated steel sheet according to an embodiment of the present invention and the chemical composition and structure configuration of a plating layer will be described in detail.

The quasicrystal-containing plated steel sheet according to this embodiment includes: a plating layer positioned on at least one surface of a steel sheet; and an alloy layer positioned at an interface between the plating layer and the steel sheet and composed of an Al—Fe intermetallic compound. A chemical composition of the plating layer contains, in atom %, Zn: 28.5% to 50%, Al: 0.3% to 12%, La: 0% to 3.5%, Ce: 0% to 3.5%, Y: 0% to 3.5%, Ca: 0% to 3.5%, Sr: 0% to 0.5%, Si: 0% to 0.5%, Ti: 0% to 0.5%, Cr: 0% to 0.5%, Fe: 0% to 2%, Co: 0% to 0.5%, Ni: 0% to 0.5%, V: 0% to 0.5%, Nb: 0% to 0.5%, Cu: 0% to 0.5%, Sn: 0% to 0.5%, Mn: 0% to 0.2%, Sb: 0% to 0.5%, Pb: 0% to 0.5%, and the balance: Mg and impurities.

The plating layer of the quasicrystal-containing plated steel sheet according to this embodiment includes, in order from the steel sheet side, a first plating layer which is composed of a structure containing an MgZn phase, an Mg phase, and a quasicrystal phase, and a second plating layer which is positioned on the first plating layer and is composed of a structure containing an $Mg_{51}Zn_{20}$ phase, a Zn phase, and a quasicrystal phase.

Incidentally, a steel sheet serving as a base material of the quasicrystal-containing plated steel sheet according to this embodiment is not particularly limited. As an example of such a steel sheet, for example, various steel sheets such as Al killed steel, ultra-low carbon steel, high carbon steel, various types of high tensile strength steel, or Ni- or Cr-containing steel can be mentioned. In addition, a steelmaking method of a base steel sheet or production conditions of the steel sheet such as steel strength, a hot rolling method, an acid cleaning method, and a cold rolling method are also not particularly limited. That is, the production conditions and the quality of material of the steel sheet to be provided as a base material of the quasicrystal-containing plated steel sheet are not particularly limited.

<Regarding Chemical Composition of Plating Layer>

First, the chemical composition of the plating layer will be hereinafter described.

Incidentally, the plating layer according to this embodiment has a distinctive structure configuration of a layered shape in which various phases each having different form, crystal structure, and composition are laminated as described later. Such a form or crystal structure of the plating layer can be observed; however, it is difficult to define the component composition of each layer configuring the plating layer. Therefore, for the chemical composition of the plating layer of the present invention, the chemical composition of the entire plating layer is defined. Incidentally, in the following description, percentage (%) representing chemical composition means atom % unless otherwise specified. The reason for this is that a mass ratio is not used but an atomic ratio is used in general for representing the constitutive equation of a metallic phase or intermetallic compound.

[Zn (Zinc): 28.5% to 50%]

Basically, Mg has poor wettability and reactivity with the steel sheet and a plating layer containing only Mg is very difficult to form on the steel sheet. This is because Fe in the steel sheet is not dispersed in the plating layer and the plating layer and the steel sheet are not in close contact with each other. Therefore, when a certain concentration or more of Zn is contained in the plating layer, reactivity (adhesion) with the base steel sheet is improved and a plating layer containing Mg as a main component can be stably formed on the steel sheet.

Further, Zn is an element that has an atomic radius close to that of Al, which is the chemical composition to be described later. In general, when Al is added in the plating layer, Al is substituted for the position of Zn rather than the position of Mg or Ca. This embodiment discloses that a brittle intermetallic compound is prevented from being formed by defining the Mg—Zn composition in the plating layer as described above and a multi-layered structure with further excellent chipping resistance is formed. Herein, in the case of adding Al as the chemical composition as described in this embodiment, substitutional behavior with the position of Zn is also changed, and thus it is necessary to define the chemical composition of Zn according to the added amount of Al. The suitable content of Zn in the plating layer satisfying this condition is 28.5% to 50%.

When the content of Zn is adjusted to 28.5% to 60%, a quasicrystal phase can be obtained as a metallic structure of the plating layer. When the content of Zn is less than 28.5%, a quasicrystal phase cannot be generated in the plating layer. In addition, when the content of Zn is more than 50%, in the production method disclosed in the present invention, a quasicrystal phase cannot be suitably generated or dispersed in the plating layer. In order to suitably control the generation of the quasicrystal phase, the content of Zn may be adjusted to 30% to 50%. The content of Zn is more preferably 35% to 45%. Moreover, the content of Zn is further preferably 36% to 40%. When the content of Zn is adjusted to 36% to 40%, the quasicrystal phase can be suitably generated at a predetermined position of the plating layer and corrosion resistance can be further improved.

[Al (Aluminum): 0.3% to 12%]

Al is an element to improve the performance of the plating layer. Specifically, when Al is contained in the plating layer, planar surface corrosion resistance of the plating layer can be improved. In addition, when Al is contained, a part of Zn present in the phase or intermetallic compound of the plating layer is substituted by Al to form a substitutional solid solution. As a result, the insulation property of the plating layer is enhanced and corrosion resistance is increased; thus, ionic reaction at the time of dissolution of the plating is suppressed and corrosion weight loss is decreased.

In particular, this substitutional effect is likely to occur with respect to Zn contained in $Mg_{51}Zn_{20}$, and when the composition ratio of Al to Zn becomes constant, the crystal grain of $Mg_{51}Zn_{20}$ is likely to be further decreased in size, and thus planar section surface corrosion resistance tends to be further improved. The present inventors have presumed that it is important for the composition range of Zn and Al to satisfy Zn/Al=7.5 to 18. Incidentally, in order to achieve further improvement in planar section surface corrosion resistance, they have presumed that it is also important to satisfy the composition ratio of Al to Ca and it is important for the composition range of Ca and Al to satisfy Ca/Al=0.4 to 1.1.

That is, generally, a certain improvement effect of corrosion resistance is expected only by containing the quasicrystal phase; however, by further limiting the component composition and producing a plated steel sheet according to the production method of the present invention, the effect of further improvement in planar section surface corrosion resistance can be expected.

Further, Al is an element to produce a certain effect on generation and growth of the quasicrystal. Furthermore, thermal history in production of the plating layer is suitably controlled as described later and an Al—Fe intermetallic compound layer such as $Al_3Fe$ (more specifically, $Al_{3.2}Fe$) or $Fe_5Al_2$ is formed at the interface between the plating layer and the base steel sheet so that adhesion of the plating layer is further improved and chipping resistance can also be further improved.

In order to more reliably achieve the effects as described above, the content of Al is adjusted to 0.3% to 12%. When the content of Al is less than 0.3%, the effect of enhancing the insulation property owing to the substitution of Zn cannot be sufficiently obtained and formation of the intermetallic compound layer may not be sufficient. In addition, the multi-layered structure is not observed and the quasicrystal phase is almost not formed.

On the other hand, when the content of Al is more than 12%, the microstructure of a second plating layer to be described below is changed to a structure configuration in which a coarse primary crystal Al phase is dispersed in the structure, and the multi-layered structure is not formed. As a result, chipping resistance may be decreased. In addition, the quasicrystal phase is also almost not observed since the Al phase is grown.

From the viewpoint of formation of the quasicrystal and the Al—Fe intermetallic compound, the suitable content of Al is more preferably 2% to 5%. When the content of Al is adjusted to 2% to 5%, the quasicrystal has a dendritic form in the first layer and thus the first plating layer is held at a proper hardness. As a result, a plated steel sheet excellent in both of corrosion resistance and adhesion can be produced. For example, it is confirmed that impact resistance property is improved in a ball impact test or the like.

[Mg (Magnesium)]

Mg (magnesium) is, similarly to Zn and Al, a main element configuring the plating layer and is an element to improve the sacrificial corrosion protection property. In addition, Mg is an important element to promote the generation of the quasicrystal phase. In this embodiment, particular limitation on the content of Mg in the plating layer is not necessary and the content of Mg may be adjusted to the content obtained by subtracting the content of impurities from the balance.

Herein, when the content of Mg is less than 45%, the ratio of Zn and Mg in the plating layer is out of balance and a brittle intermetallic compound is likely to be formed in the plating layer. When such an intermetallic compound is formed, adhesion of the plating layer extremely deteriorates and it is difficult to form the plating layer on the steel sheet. For these reasons, the lower limit of the content of Mg in the plating layer is set to 45%. Incidentally, the content of Mg is preferably 50% or more and further preferably 55% or more.

On the other hand, when the content of Mg is more than 67%, the content of Zn in the microstructure of the second plating layer to be specifically described below is decreased and the amount of the Mg phase generated is increased so that corrosion resistance is decreased. For these reasons, the upper limit of the content of Mg in the plating layer is set to 67%. Incidentally, the content of Mg is preferably 62% or less and further preferably 57% or less.

The plating layer of the quasicrystal-containing plated steel sheet according to this embodiment contains impurities in addition to the basic compositions described above. Herein, impurities mean elements which are mixed from raw materials of steel and a plating alloy or production environment when the quasicrystal-containing plated steel sheet according to this embodiment is produced on an industrial scale, such as C (carbon), N (nitrogen), O (oxygen), P (phosphorus), S (sulfur), or Cd (cadmium). Even when these elements each are contained at about 0.1% as impurities, the above-described effects are not impaired.

A metal coating layer of the plated steel sheet according to this embodiment may further contain at least one or more selected compositions selected from Ca, Y, La, Ce, Si, Ti, Cr, Fe, Co, Ni, V, Nb, Cu, Sn, Mn, Sr, Sb, and Pb instead of a part of the Mg as the balance. A composition to be contained among these selected compositions may be appropriately determined depending on the purpose thereof. Therefore, limitation on the lower limit of these selected compositions is not necessary, and the lower limit may be 0%. Moreover, even when these selected compositions are contained as impurities, the above-described effects are not impaired.

[Ca (Calcium): 0% to 3.5%]

Ca may be contained as necessary in order to improve operability of hot-dip plating when a hot-dip plating method is employed for forming the plating layer. When the quasicrystal-containing plated steel sheet according to this embodiment is produced by the hot-dip plating method, a molten Mg alloy having high oxidation property is held in the atmosphere as a plating bath. For this reason, it is preferable to employ any prevention means for oxidation of Mg. Ca is more easily oxidized as compared to Mg, and Ca in a molten state forms a stable oxide layer on the surface of the plating bath, and thus the oxidation of Mg in the bath is prevented. Therefore, the content of Ca in the plating layer may be set to 0% to 3.5%.

Further, when Ca is contained in the plating bath, the formation of a brittle Mg—Zn-based intermetallic compound contained in the plating layer is suppressed, and as a result, a preferable plating layer structure from the viewpoint of adhesion of the plating layer can be obtained. In addition, when Ca is contained in the plating bath, the amount of dross generated can be suppressed and decrease the viscosity of the plating bath, so that operability of the plating bath highly containing Mg can also be improved. These effects regarding Ca are confirmed when the content of Ca is 0.3% or more, and when the content of Ca is adjusted to 1.0% or more, the effects can be more reliably exhibited. Therefore, when Ca is contained in the plating bath, the content of Ca is more preferably set to 1.0% or more. On the other hand, when the content of Ca is more than 2.5%, the ratio of Zn and Mg is out of balance and thus there is a high possibility that a brittle intermetallic compound is formed in the plating layer or intermetallic compounds containing Ca is formed to decrease corrosion resistance. Therefore, the content of Ca is preferably set to 2.5% or less. When the concentration of Ca is high, there is a tendency that peeling easily occurs at a convexo-concave edge portion, a tip portion, or the like in a test for evaluating adhesion such as a ball impact test.

Further, from the viewpoint of controlling the crystal grain of $Mg_{51}Zn_{20}$, the content of Ca preferably satisfies 1 to 2%. Furthermore, as described above, the composition ratio of Ca to Al more preferably satisfies Ca/Al=0.4 to 1.1. At this time, the substitutional effect of Mg and Ca in $Mg_{51}Zn_{20}$ occurs and thus the crystal grain of $Mg_{51}Zn_{20}$ tends to decrease in size.

[Y (Yttrium): 0% to 3.5%]
[La (Lanthanum): 0% to 3.5%]
[Ce (Cerium): 0% to 3.5%]

Y, La, and Ce, similarly to Ca, may be contained as necessary in order to improve operability of hot-dip plating when the hot-dip plating method is employed for forming the plating layer. Y, La, and Ce are more easily oxidized as compared to Mg, and Y, La, and Ce in a molten state form a stable oxide layer on the surface of the plating bath, and thus the oxidation of Mg in the bath is prevented. Therefore, the contents of Y, La, and Ce in the plating layer may be set to 0% to 3.5%, 0% to 3.5%, and 0% to 3.5%, respectively. Further preferably, regarding the content of each of Y, La, and Ce, the lower limit may be set to 0.3% and the upper limit may be set to 2.0%.

Incidentally, when at least one element selected from Ca, Y, La, and Ce is contained at 0.3% or more in total, the plating bath with a high content of Mg can be held without being oxidized in the atmosphere, which is preferable. On the other hand, since Ca, Y, La, and Ce are easily oxidized and adversely affect corrosion resistance, the upper limit of the contents of Ca, Y, La, and Ce is preferably set to 3.5% in total. That is, it is preferable that the contents of Ca, Y, La, and Ce in the chemical composition of the plating layer satisfy 0.3%≤Ca+Y+La+Ce≤3.5% in atom %.

Further, in order to more suitably generate the quasicrystal phase in the plating layer, the contents of Ca, Y, La, and Ce are preferably set to 0.3% or more and 2.0% or less in total. These elements are considered to be substituted for Mg configuring the quasicrystal phase, but when a large amount of these elements are contained, the generation of the quasicrystal phase is considered to be inhibited. When these elements are contained at an appropriate content, the red rust suppression effect of the quasicrystal phase and other phases is improved. This effect is presumed to be caused by the influence of elution timing of the quasicrystal phase on the maintaining of white rust. That is, it is presumed that after the quasicrystal phase in the plating layer is eluted, these elements are incorporated into white rust to be formed so that white rust-proofing property is improved and the period of time until red rust is generated due to corrosion of base iron is lengthened.

Further, the above-described effects (oxidation prevention and generation of the quasicrystal phase) are relatively greatly obtained by containing Ca, La, and Ce among those elements. On the other hand, it is found out that the above-described effects obtained by containing Y are smaller as compared to Ca, La, and Ce. The reason for this is presumed that Ca, La, and Ce are elements that are easily oxidized and rich in reactivity as compared to Y. When the chemical composition of the quasicrystal phase is analyzed by an energy dispersive X-ray spectroscopy (EDX), Y is not detected in many cases, and thus it is presumed that Y is not easily incorporated into the quasicrystal. On the other hand, Ca, La, and Ce tend to be detected from the quasicrystal, exceeding the contents thereof. Therefore, Y may not be necessarily contained in the plating layer. When Y is not contained in the plating layer, the chemical composition is set to 0.3%≤Ca+La+Ce≤3.5% and may be set to 0.3%≤Ca+La+Ce≤2.0%.

[Si (Silicon): 0% to 0.5%]
[Ti (Titanium): 0% to 0.5%]
[Cr (Chromium): 0% to 0.5%]

Si, Ti, and Cr may be contained as necessary in order to suitably generate the quasicrystal phase in the plating layer. When a trace amount of Si, Ti, and Cr is contained in the plating layer, the quasicrystal phase is easily generated and thus the structure of the quasicrystal phase is stabilized. Si is considered to be a starting point (core) of the generation of the quasicrystal phase by combining Si with Mg to form fine $Mg_2Si$. Further, Ti and Cr with poor reactivity with Mg are considered to be a starting point (core) of the generation of the quasicrystal phase by forming a fine metallic phase. The generation of the quasicrystal phase is generally affected by a cooling rate in production. However, when Si, Ti, and Cr are contained in the plating layer, cooling rate dependency with respect to the generation of the quasicrystal phase tends to decrease. Therefore, the contents of Si, Ti, and Cr in the plating layer may be set to 0% to 0.5%, 0% to 0.5%, and 0% to 0.5%, respectively. Further preferably, regarding the content of each of Si, Ti, and Cr, the lower limit may be set to 0.005% and the upper limit may be set to 0.1%.

Further, when at least one element selected from Si, Ti, and Cr is contained at 0.005% to 0.5% in total, the structure of the quasicrystal is further stabilized, which is preferable. That is, it is preferable that the total content of Si, Ti, and Cr in the chemical composition of the plating layer satisfy 0.005%≤Si+Ti+Cr≤0.5% in atom %. In addition, when these elements are contained at an appropriate content, a large amount of the quasicrystal is suitably generated to improve corrosion resistance of the surface of the plating layer. As a result, corrosion resistance in a wet environment is further improved, and thus the generation of white rust is suppressed.

[Co (Cobalt): 0% to 0.5%]
[Ni (Nickel): 0% to 0.5%]
[V (Vanadium): 0% to 0.5%]
[Nb (Niobium): 0% to 0.5%]

Co, Ni, V, and Nb are elements having the same effects as those of Si, Ti, and Cr described above. In order to obtain the above-described effects, the contents of Co, Ni, V, and Nb may be set to 0% to 0.5%, 0% to 0.5%, 0% to 0.5%, and 0% to 0.5%, respectively. Further preferably, regarding the content of each of Co, Ni, V, and Nb, the lower limit may be set to 0.05% and the upper limit may be set to 0.1%. However, when these elements are compared to Si, Ti, and Cr, the effect of improving corrosion resistance is small.

[Fe (Iron): 0% to 2%]

An element configuring the steel sheet may be mixed in the plating layer from the steel sheet serving as a base material in some cases. In particular, in the hot-dip plating method, adhesion is increased by interdiffusion of the element due to solid-liquid reaction between the steel sheet and the plating layer. For this reason, a certain amount of Fe may be contained in the plating layer. For example, Fe may be contained at around 2% as the chemical composition of the entire plating layer. However, Fe diffused to the plating layer may be reacted with Al and Zn near the interface between the steel sheet and the plating layer to generate the intermetallic compound in many cases. For this reason, the possibility that the contained Fe affects corrosion resistance and chipping resistance of the plating layer is small. Therefore, the content of Fe in the plating layer may be set to 0% to 2%. Similarly, the possibility that an element that configures the steel sheet and is diffused to the plating layer (an element which is diffused from the steel sheet to the plating layer, other than elements described in this embodiment) affects corrosion resistance of the plating layer is small.

[Cu (Copper): 0% to 0.5%]
[Sn (Tin): 0% to 0.5%]

In order to improve adhesion between the steel sheet and the plating layer, preplating with Ni, Cu, Sn, and the like may be performed on the steel sheet. When the quasicrystal-containing plated steel sheet is produced by using the steel sheet subjected to preplating, these elements may be contained up to about 0.5% in the plating layer. Among Ni, Cu, and Sn serving as compositions for preplating, Cu and Sn do not have the above-described effects of Ni. However, even when about 0.5% of each of Cu and Sn is contained in the plating layer, the possibility that Cu and Sn affect generation behavior of the quasicrystal or corrosion resistance and chipping resistance of the plating layer is small. Therefore, the contents of Cu and Sn in the plating layer may be set to 0% to 0.5% and 0% to 0.5%, respectively. Further preferably, regarding the content of each of Cu and Sn, the lower limit may be set to 0.005% and the upper limit may be set to 0.4%.

[Mn (Manganese): 0% to 0.2%]

Recently, high tensile strength steel (high strength steel) is being used as a steel sheet serving as a base material for the quasicrystal-containing plated steel sheet. When the quasicrystal-containing plated steel sheet is produced by using the high tensile strength steel, elements such as Si and Mn contained in the high tensile strength steel may be diffused in the plating layer. Of Si and Mn, Mn does not have the above-described effects of Si. However, even when about 0.2% of Mn is contained in the plating layer, the possibility that Mn affects generation behavior of the quasicrystal or corrosion resistance and chipping resistance of the plating layer is small. Therefore, the content of Mn in the plating layer may be set to 0% to 0.2%. Further preferably, regarding the content of Mn, the lower limit may be set to 0.005% and the upper limit may set to 0.1%.

[Sr (Strontium): 0% to 0.5%]
[Sb (Antimony): 0% to 0.5%]
[Pb (Lead): 0% to 0.5%]

Sr, Sb, and Pb are elements to improve plating appearance and have the effect of improving the anti-glare property. In order to obtain this effect, the contents of Sr, Sb, and Pb in the plating layer may be set to 0% to 0.5%, 0% to 0.5%, and 0% to 0.5%, respectively. When the content of each of Sr, Sb, and Pb is in the above range, there is almost not the influence of Sr, Sb, and Pb on corrosion resistance and chipping resistance. Further preferably, regarding the content of each of Sr, Sb, and Pb, the lower limit may be set to 0.005% and the upper limit may be set to 0.4%.

There is almost not the influence of Sr, Sb, and Pb on plating properties such as workability and corrosion resistance, but Sr, Sb, and Pb affect plating appearance. There is metallic luster on the surface of the plating layer disclosed in the present invention, but when those elements are contained at the above-described composition range, metallic luster is lost and thus the anti-glare effect can be obtained.

[Measurement Method of Chemical Composition]

The chemical composition of the plating layer described above can be measured by using a known analysis method such as an inductively coupled plasma atomic emission spectrometry (ICP-AES) or an inductively coupled plasma mass spectrometry (ICP-MS). The quasicrystal-containing plated steel sheet is immersed in 10% hydrochloric acid added with an inhibitor for about 1 minute and the plating layer portion is peeled off to thereby prepare a solution in which this plating layer is dissolved. The obtained solution is analyzed by an ICP-AES, an ICP-MS, or the like and thus the chemical composition can be obtained as the average chemical composition of the entire plating layer.

Further, in the hot-dip plating method, a plating layer having a chemical composition almost similar to the chemical composition of the hot-dip plating bath is formed. For this reason, regarding an element of which interdiffusion between the steel sheet and the plating layer can be ignored, the chemical composition of the plating bath to be used is measured and the obtained measurement value may be used as a substitute for the chemical composition of the plating layer. Small pieces of ingot are collected from the plating bath, drill powder is collected, and then a solution in which this drill powder is dissolved with acid is prepared. The obtained solution is analyzed by an ICP or the like to obtain the chemical composition of the plating bath. The measurement value of the obtained chemical composition of the plating bath may be used as the chemical composition of the plating layer.

Hereinbefore, the chemical composition of the quasicrystal-containing plated steel sheet according to this embodiment has been described in detail.

<Regarding Structural Configuration of Plating Layer>

Next, the plating structure configuration of the quasicrystal-containing plated steel sheet according to this embodiment will be described in detail.

The plating layer of the quasicrystal-containing plated steel sheet according to the present invention is configured by a composite layer having a multi-layered structure in which a plurality of layers each having a different structure from each other are laminated in the thickness direction of the plating layer. Specifically, the plating layer according to this embodiment has, in order from the steel sheet side, a first plating layer composed of the structure containing an MgZn phase, an Mg phase, and a quasicrystal phase and a second plating layer positioned on the first plating layer and composed of the structure containing an $Mg_{51}Zn_{20}$ phase, a Zn phase, and a quasicrystal phase. Further, this second plating layer is preferably composed of the structure in which the maximum grain size is 1 μm or less in terms of circle equivalent diameter.

The quasicrystal-containing plated steel sheet according to this embodiment has, as specifically described below, a feature that the quasicrystal phase is contained as a metallic structure in the plating layer. Herein, in the following description, this quasicrystal phase will be first described.

The quasicrystal phase is defined as a quasicrystal phase in which the contents of Mg, Zn, and Al contained in the grains of the quasicrystal phase satisfy 0.5≤Mg/(Zn+Al) ≤0.83 in atom %. That is, the quasicrystal phase is defined as a quasicrystal phase in which the ratio of the Mg atom to the total of the Zn atom and the Al atom, that is, Mg:(Zn+Al), is 3:6 to 5:6. The theoretical ratio of the quasicrystal phase is considered to be Mg:(Zn+Al)=4:6. The chemical composition of the quasicrystal phase is preferably calculated by quantitative analysis using a transmission electron microscope-energy dispersive X-ray spectroscopy (TEM-EDX), quantitative analysis using electron probe microanalyzer (EPMA) mapping, or the like. Incidentally, it is not easy to define the quasicrystal by an accurate chemical formula, unlike the intermetallic compound. The reason for this is that the repeating lattice unit of the quasicrystal phase cannot be defined, unlike the unit lattice of the crystal, and it is also difficult to specify the atomic positions of Zn and Mg. For reference, when the quasicrystal layer is measured by a TEM-EDX, the quasicrystal phase is detected such that the ratio of Zn is higher than that of the $Mg_{51}Zn_{20}$ phase and the ratio of Mg is lower than that of the $Mg_{51}Zn_{20}$ phase. In addition, regarding Al and, if an element such as Ca is contained, the element such as Ca, in the quasicrystal phase, there is a tendency that the ratio of Al or the element such as Ca is detected to be higher than that of the $Mg_{51}Zn_{20}$ phase. Incidentally, the chemical composition of the metallic phase other than the quasicrystal phase contained in the plating layer can also be identified by quantitative analysis using a TEM-EDX, quantitative analysis using EPMA mapping, or the like.

Further, in order to identify the metallic phase which is focused on as the quasicrystal phase, it is necessary to capture an electron beam diffraction image with a TEM and to determine whether a fivefold symmetry crystal structure is observed in the electron beam diffraction image. The fivefold symmetry crystal structure can be identified by obtaining an electron beam diffraction image called a Penrose pattern. Since it is difficult to observe the range of 10 μm or more with a TEM, as specifically described below, a phase contained in the structure is estimated from the representative field of view of the plating layer, and when the same structure is obtained, the metallic phase which is focused on may be identified as the quasicrystal phase on the basis of the measurement result of EPMA or EDX.

The existence of the quasicrystals effects on the basic performance of the plated steel sheet and the red rust suppression effect. When the quasicrystal phase is present, generally, it is found out that time until generation of red rust can be ensured for the plating thickness (μm)×150 hours or longer until red rust is generated on the plated surface.

Hereinafter, the structure configuration of the plating layer according to this embodiment will be described in detail.

FIG. 1 is an electron micrograph of the plating layer of the quasicrystal-containing plated steel sheet according to this embodiment and this electron micrograph is obtained by observing a cutting surface in which a cutting direction is parallel to the sheet thickness direction of the quasicrystal-containing plated steel sheet. This cross-sectional structure photograph is a bright-field image obtained by observing the cutting surface with a TEM. The more specific structure configuration of the plating layer has, as shown in FIG. 1, a second plating layer 1 positioned at the surface side of the plating layer (the opposite side of the steel sheet) and composed of a microstructure and a first plating layer 2 positioned at the inner portion of the second plating layer (that is, the steel sheet side of the plating layer) and containing a structure that is grown in the thickness direction of the plating layer. Further, an alloy layer (interface alloy layer) 3 formed from an Al—Fe intermetallic compound is formed at an interface between such a plating layer having a multi-layered structure and a base steel sheet.

Hereinafter, the second plating layer positioned at the surface side of the plating layer and composed of a microstructure is also simply described as the "fine layer" and the first plating layer positioned at the steel sheet side of the plating layer and containing a structure that is grown in the thickness direction of the plating layer is also simply described as the "compound layer." In addition, the Fe—Al intermetallic compound layer positioned at the interface of the base steel sheet is also simply described as the "interface alloy layer."

○Second Plating Layer (Fine Layer)

The fine layer (second plating layer) 1 positioned at the outermost layer of the plating layer among the plurality of layers configuring the plating layer has the structure in which the maximum grain size is 1 μm or less in terms of circle equivalent diameter. When the fine layer 1 is configured by such a fine structure, the effect of controlling crack propagation in the plating layer to be described later (that is, chipping resistance), which is one of the features of the present invention, is exhibited. That is, when the crystal grain size of the structure configuring the fine layer 1 is adjusted to be fine, propagation of cracks inside the plating layer can be suppressed.

Herein, the circle equivalent diameter of the maximum grain size included in the fine layer 1 is preferably 500 nm or less and further preferably 200 nm or less. Incidentally, in an example shown in FIG. 1, most of the crystal grain sizes of the phases configuring the fine layer 1 are 100 nm or less in terms of circle equivalent diameter (a crystal phase of 1 μm or more is not observed). In addition, the lower limit value of the circle equivalent diameter of the maximum grain size included in the fine layer 1 is not particularly limited. However, as necessary, this lower limit value may be set to 10 nm.

In the fine layer 1, the area of the structure in which the maximum grain size is 1 μm or less in terms of circle equivalent diameter is preferably 90% or more in the cutting surface of an arbitrary plating layer with respect to the cross-sectional area of the entire fine layer 1. In other words, in the fine layer 1, the area ratio of the structure in which the maximum grain size is 1 μm or less in terms of circle equivalent diameter is preferably 90% or more. When the area ratio of the structure in which the maximum grain size is 1 μm or less in terms of circle equivalent diameter is adjusted to 90% or more, the effect of suppressing crack propagation inside the plating layer is reliably exhibited and corrosion resistance can be further improved. The area ratio of the structure in which the maximum grain size is 1 μm or less in terms of circle equivalent diameter is more preferably 95% or more and further preferably 100%.

When a large crystal phase (or a quasicrystal phase) is present in the fine layer 1, there is a tendency that the frequency of peeling of the plating layer is increased at the time of a gravel test. In addition, generally, when the crystal grain of the fine layer 1 is fine, corrosion resistance tends to be improved and plating hardness tends to be increased.

The metallic phase configuring the structure of the fine layer 1 is at least the Zn phase, the quasicrystal phase, and the $Mg_{51}Zn_{20}$ phase, and a phase containing both of Zn and Mg in which the crystal structure is not clear may exist. In addition, among the Zn phase, the quasicrystal phase, and the $Mg_{51}Zn_{20}$ phase mainly configuring the fine layer 1, the main metallic phase is the $Mg_{51}Zn_{20}$ phase. Further, regarding the fine layer 1 according to this embodiment, the Mg phase almost does not exist in the fine layer 1.

Since Mg of the plating surface layer is blackened when existing in a wet environment and thus may impair appearance, particularly, the fine layer 1 preferably contains no Mg.

Figure 2A:
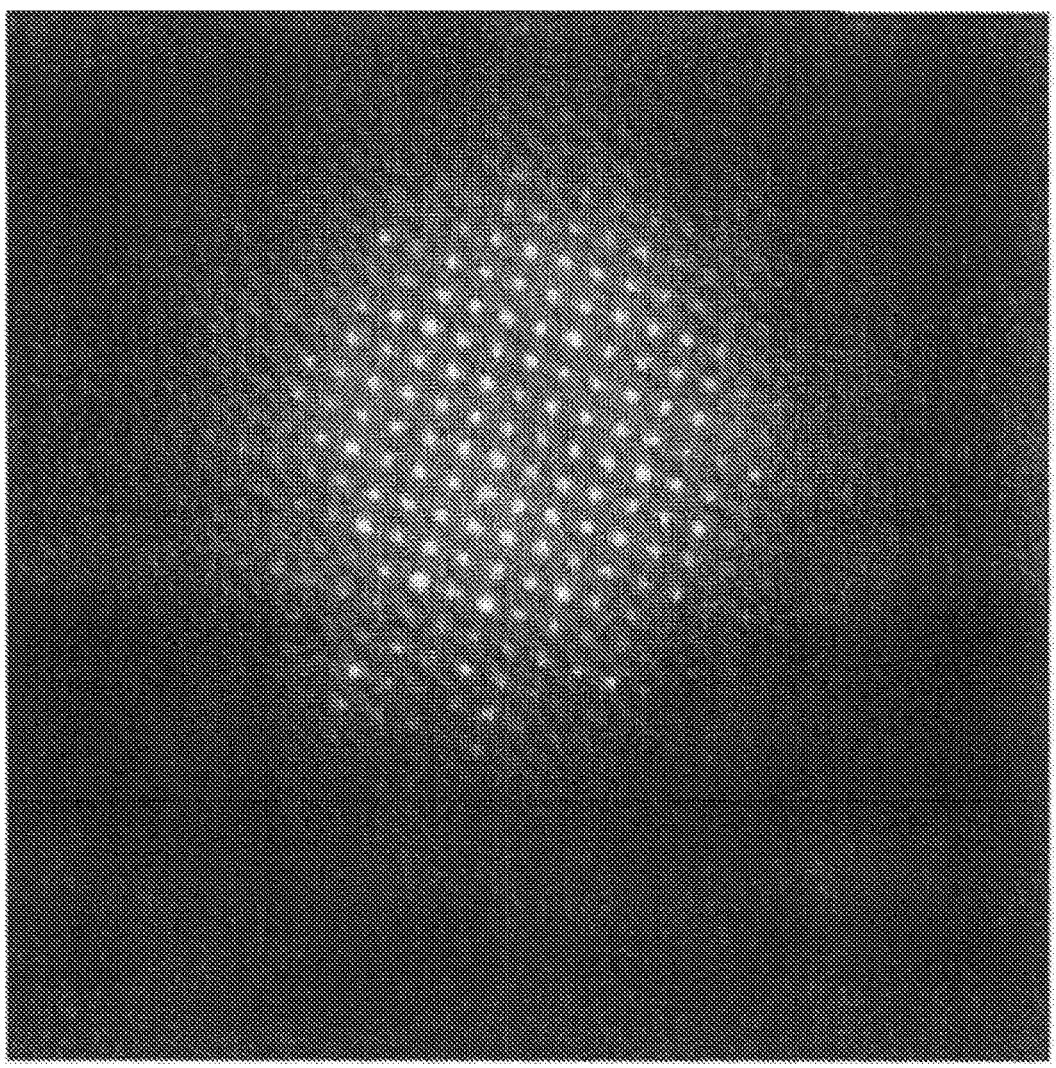
FIG. 2A shows an example of an electron beam diffraction image of an $Mg_{51}Z_{20}$ phase included in a second plating layer of the plating layer according to the embodiment of the present invention.
Figure 2B:
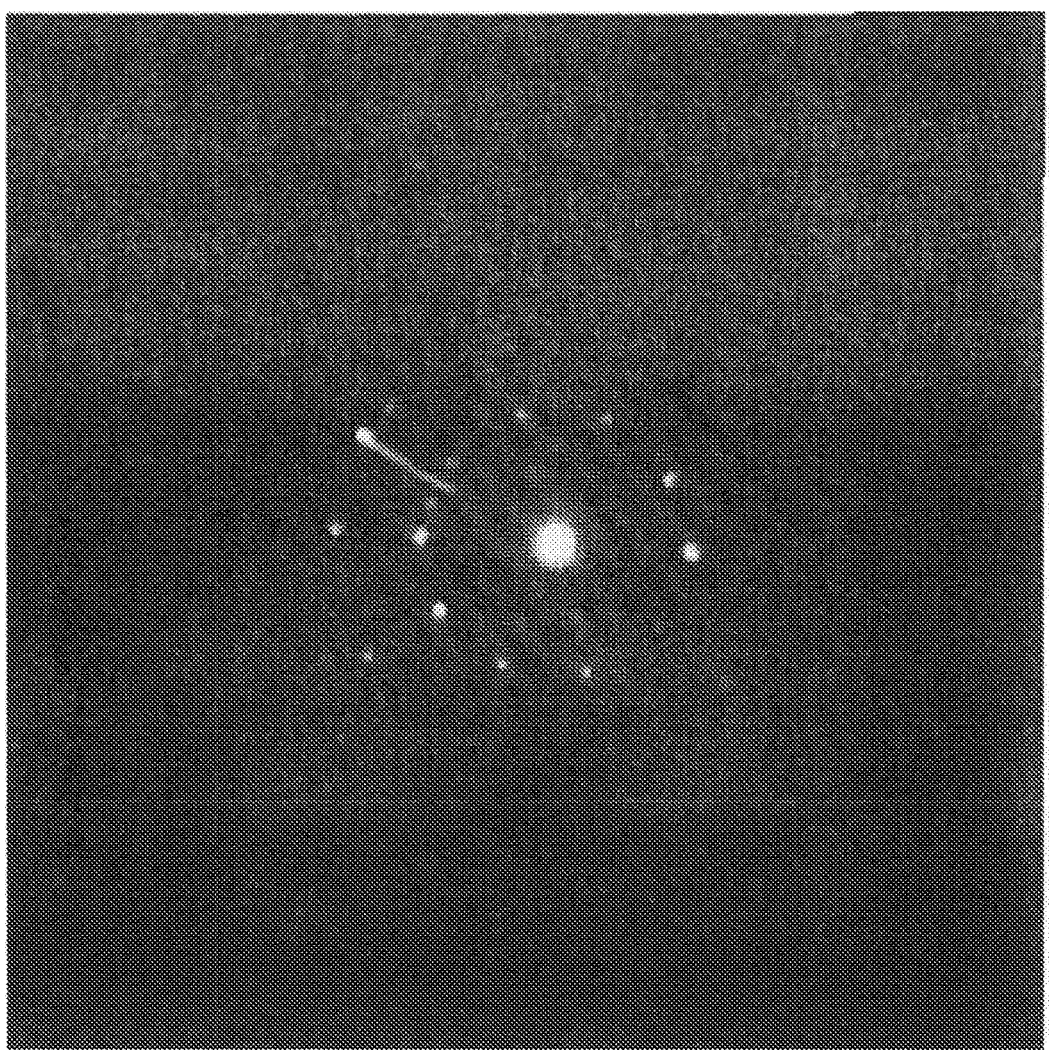
FIG. 2B shows an example of an electron beam diffraction image of a quasicrystal phase included in the second plating layer of the plating layer according to the embodiment of the present invention.

FIG. 2A is an electron beam diffraction image obtained from the black portion occupying the large part in the fine layer 1 shown in FIG. 1 and FIG. 2B is an electron beam diffraction image obtained from the white portion inside the fine layer 1 shown in FIG. 1. The electron beam diffraction image shown in FIG. 2A which occupies the large part in the fine layer 1 is an electron beam diffraction image derived from the $Mg_{51}Zn_{20}$ phase. According to the electron beam diffraction image shown in FIG. 2A, it can be confirmed that the $Mg_{51}Zn_{20}$ phase is contained in the fine layer 1. In addition, in FIG. 2B, an electron beam diffraction image of the regular decagon with a radial shape derived from the icosahedron structure can be confirmed although the intensity is weak. The electron beam diffraction image shown in FIG. 2B is an image obtained from the fine quasicrystal phase contained in the fine layer 1. According to the electron beam diffraction image shown in FIG. 2B, it can be confirmed that the fine quasicrystal phase is contained in the fine layer 1.

Incidentally, although not shown in the drawing, it is confirmed that the Zn phase is contained in the fine layer 1 by analyzing an electron beam diffraction image obtained from the gray portion in the fine layer 1. Incidentally, the existence of the intermetallic compound such as the $Mg_{51}Zn_{20}$ phase or the metallic phase such as the Zn phase contained in the fine layer 1 can be confirmed by an electron beam diffraction image obtained by a TEM as described above or by an X-ray diffractometer (XRD).

The $Mg_{51}Zn_{20}$ phase is defined as a constituent phase that can be identified by JCPDS Card: PDF #00-008-0269 or #00-065-4290 or Non-Patent Literature by Azuma et al. (Journal of solid state chemistry 36, 225-233 (1981)).

Further, according to Non-Patent Literature by Azuma et al. described above, it is reported that the $Mg_{51}Zn_{20}$ phase has a unit lattice close to a cubical crystal and has an atomic structure forming an icosahedron in the unit lattice. The unit lattice of this $Mg_{51}Zn_{20}$ is different from the icosahedron structure of the quasicrystal, and thus strictly speaking, the $Mg_{51}Zn_{20}$ and the quasicrystal are different phases from each other. However, the crystal structures of the $Mg_{51}Zn_{20}$ and the quasicrystal are similar to each other, and thus it is considered that the $Mg_{51}Zn_{20}$ phase affects the generation of the quasicrystal phase.

The Zn phase contained in the fine layer 1 has largely different chemical composition and crystal structure from those of the quasicrystal phase. It can be determined that element diffusion sufficiently occurs at high temperature when the quasicrystal-containing plated steel sheet is produced, and as a result, a stable phase is generated as this Zn phase.

Incidentally, determination on existence of the Mg phase may be confirmed by a TEM-EDX, an SEM-EDX, or the like, or may be confirmed by an XRD. For example, if the diffraction intensity of the Mg phase from the (110) plane is 1% or less with respect to the diffraction intensity of the $Mg_{51}Zn_{20}$ phase at a diffraction angle: $2\theta=36.496°$ in the XRD diffraction pattern obtained by measuring the fine layer 1, it can be said that the Mg phase is not contained in the metallic structure of the fine layer 1. Similarly, if the existence fraction of the crystal grain of the Mg phase is 3% or less in the TEM diffraction image of the fine layer 1 when arbitrarily 100 or more crystal grains are sampled, it can be said that the Mg phase is not contained in the metallic structure of the fine layer 1. The existence fraction of the crystal grain of the Mg phase is further preferably less than 2% and most preferably less than 1%.

Herein, the existence ratio of each of the aforementioned phases in the fine layer 1 may not be particularly defined. The existence ratio of each phase varies depending on the component composition, but the factor that influences chipping resistance is fineness of the structure dependent on the crystal grain size rather than the existence ratio of each phase.

In this plating composition range, even when the existence ratio of each of the aforementioned phases in the fine layer 1 varies, the influence thereof on the planar section surface corrosion resistance is small and corrosion resistance deterioration that is problematic does not occur.

Further, the thickness of the fine layer 1 is also not particularly limited, but generally, the thickness of the general plating layer of the hot-dip plated steel sheet in which the coating amount tends to increase is about 3 μm to 30 μm, and since the fine layer 1 according to this embodiment occupies ¼ to ⅔ of the entire plating layer in many cases, the thickness of the fine layer 1 can be set to 0.75 to 20 μM.

The fine layer (second plating layer) 1 composed of the structure as described above is a relatively hard plating layer as compared to the compound layer (first plating layer) 2 to be described later. Specifically, a Vickers hardness of the fine layer 1 measured according to BS Z2244 is 250 to 350 Hv as an average value of arbitrary 30 fine layers 1. When the fine layer 1 is composed of the structure in which the maximum grain size is 1 μm or less in terms of circle equivalent diameter and is a harder layer than the first plating layer, the effect of suppressing crack propagation inside the plating layer as described later (that is, chipping resistance) can be exhibited. The hardness distribution of the fine layer 1 is dependent on the cooling rate in plating production. When the plating hardness increases, it is effective in improvement in scratch resistance, abrasion resistance, and the like in addition to chipping resistance.

∘First Plating Layer (Compound Layer)

Among the plurality of layers configuring the plating layer, the compound layer (first plating layer) 2, which is positioned inside the plating layer (at the steel sheet side), that is, between the fine layer 1 serving as the second plating layer and the steel sheet, and is grown in the thickness direction of the plating layer, is composed of the structure containing an MgZn phase, an Mg phase, and a quasicrystal phase. Hereinafter, the representative form of the compound layer will be described in detail.

The structure of the compound layer 2 includes first the MgZn phase that is a structure of the gray portion positioned at the bottom portion of the compound layer 2 in FIG. 1. This MgZn phase, also as clearly known from FIG. 1, is a hard structure having a relatively large crystal grain size, that is, a circle equivalent diameter of 1 μm or more. Further, the compound layer 2 includes the structure, which is minute as compared to the hard MgZn phase and is grown in the thickness direction of the plating layer, at the upper portion side of the hard MgZn phase (the plating layer surface side). This structure grown in the thickness direction of the plating layer is configured by a minute MgZn phase and a quasicrystal phase, and a soft Mg phase is present to cover voids of the structures of the MgZn phase and the quasicrystal phase.

Herein, the crystal grain size of the hard MgZn phase contained in the compound layer 2 is preferably 500 nm or more in terms of circle equivalent diameter and further preferably 1 μm or more. In addition, the upper limit value of the circle equivalent diameter of the crystal grain of the hard MgZn phase contained in the compound layer 2 is not particularly limited. It is noted that the upper limit value thereof may be set to 5 μm as necessary. The size of the MgZn phase relates to the thickness of the compound layer 2. When the size decreases, the compound layer 2 also decreases in thickness and when the size increases, the compound layer 2 also increases in thickness. Based on the determination of a suitable thickness of the compound layer, it can be said that a suitable thickness of MgZn is 500 nm to 5 μm. When the circle equivalent diameter of the MgZn phase is as large as 1 μm, the thickness of the compound layer 2 also increases, and for example, a portion to which the base iron is exposed at the time of chipping is decreased. That is, since the plating layer of the compound layer 2 remains immediately after chipping, red rust is not generated and white rust covers the compound layer 2.

Further, the minute MgZn phase and the minute quasicrystal phase of the MgZn phase are dendritically grown in the thickness direction of the plating layer and the cooling direction as described above in many cases. For this reason, when the compound layer 2 is observed with an SEM, an optical microscope, or the like, the compound layer 2 seems like a widespread fan as shown in FIG. 1. Moreover, a portion corresponding to the branch of the dendritically grown structure is mainly the quasicrystal phase rather than the MgZn phase in many cases. That is, a case where the quasicrystal phase is mainly present and the minute MgZn phase is also present in the portion corresponding to the branch of the dendritically grown structure, and the Mg phase is present in a portion corresponding to the leaf of the branch can be mentioned as an example. The dendritic structure indicates a structure having no clear compartment in an arbitrary cross section, and is a structural form which is present in a state in which the form cannot be replaced with an equivalent circle, and is different from a structural form which is aggregated at a specific area, such as a sphere, a flat circle, or a polygonal shape. Regarding chipping resistance property, the effect of suppressing crack propagation is not obtained in the distribution of a sphere or polygonal structure, and when the dendritic structure exists, the effect of suppressing crack propagation can be obtained.

Figure 3A:
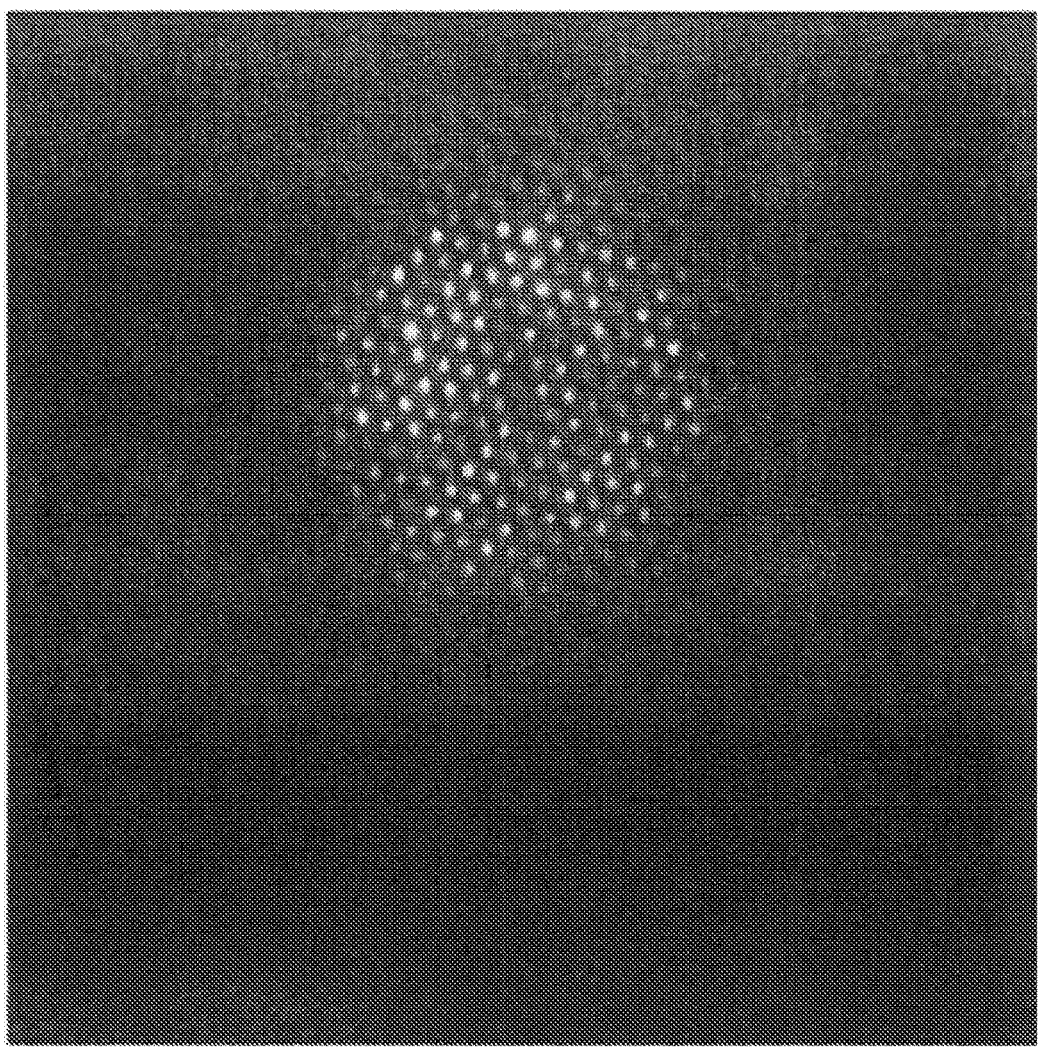
FIG. 3A shows an example of an electron beam diffraction image of an MgZn phase included in a first plating layer of the plating layer according to the embodiment of the present invention.
Figure 3B:
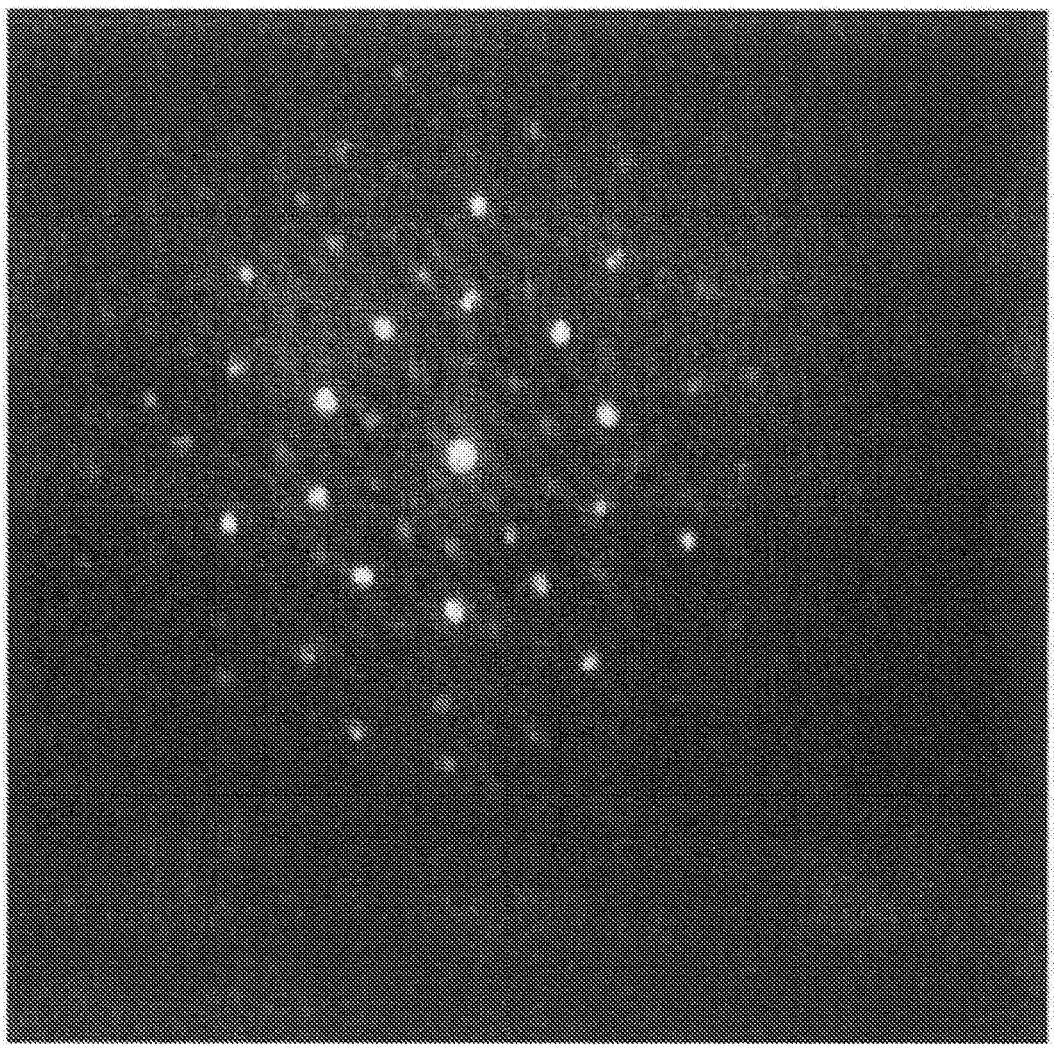
FIG. 3B shows an example of an electron beam diffraction image of a quasicrystal phase included in the first plating layer of the plating layer according to the embodiment of the present invention.

FIG. 3A is an electron beam diffraction image obtained from a coarse MgZn phase of the compound layer 2 shown in FIG. 1, and FIG. 3B is an electron beam diffraction image obtained from the dendritically grown structure of the compound layer 2 shown in FIG. 1. The electron beam diffraction image shown in FIG. 3A is an electron beam diffraction image derived from the coarse MgZn phase. According to the electron beam diffraction image shown in FIG. 3A, it can be confirmed that the MgZn phase is contained in the compound layer 2. In addition, in FIG. 3B, an electron beam diffraction image of the regular decagon with a radial shape derived from the icosahedron structure can be confirmed. The electron beam diffraction image shown in FIG. 3B is an image obtained from the quasicrystal phase contained in the compound layer 2. According to the electron beam diffraction image shown in FIG. 3B, it can be confirmed that the quasicrystal phase is contained in the compound layer 2. Incidentally, although not shown in the drawing, it is confirmed that the Mg phase is contained in the compound layer 2 by analyzing an electron beam diffraction image obtained from a portion corresponding to the leaf of the branch of the dendritic structure in the compound layer 2. Incidentally, the existence of the intermetallic compound such as the MgZn phase or the metallic phase such as the Mg phase contained in the compound layer 2 can be confirmed by an electron beam diffraction image obtained by a TEM as described above or by an XRD.

The area of the clumped MgZn phase in the compound layer 2 is preferably 10% to 70% in the cutting surface of an arbitrary plating layer with respect to the cross-sectional area of the entire compound layer 2. In other words, the area ratio of the MgZn phase in the compound layer 2 is preferably 10% to 70%. When the area ratio of the clumped MgZn phase is 10% to 70%, chipping resistance is reliably exhibited and corrosion resistance can be further improved. The area ratio of the clumped MgZn phase is more preferably 20% to 40%.

Herein, regarding the existence ratio and form of each of the aforementioned phases in the compound layer 2, various states are considered. The existence ratio and form of each of the aforementioned phases in the compound layer 2 may not be particularly defined. In this plating composition range, even when the existence ratio and form of each of the aforementioned phases in the compound layer 2 vary, the influence thereof on planar section surface corrosion resistance is small and the problematic corrosion resistance deterioration does not occur.

Further, the thickness of the compound layer 2 is also not particularly limited, but generally, the thickness of the general plating layer of the hot-dip plated steel sheet in which the coating amount tends to increase is about 3 μm to 30 μm, and since the compound layer 2 according to this embodiment occupies ⅓ to ¾ of the entire plating layer in many cases, the thickness of the compound layer 2 can be set to 1 to 23 μm.

Incidentally, in the compound layer 2, oxides such as MgO, Fe oxide, and Zn oxide may be mixed as inevitable impurities in the course of producing the plating layer during the production process. However, there is no problem as long as these impurities are contained at a trace amount, and favorable chipping resistance and corrosion resistance that are the effects of the present invention can be sufficiently obtained as long as the compound layer 2 is configured by the above-described phases. Further, in the compound layer 2, a trace amount of "$Mg_{51}Zn_{20}$" may be observed in addition to the MgZn phase, the Mg phase, and the quasicrystal phase in some rare cases; however, also in this case, there is no problem as long as the "$Mg_{51}Zn_{20}$" is contained at a trace amount, and favorable chipping resistance and corrosion resistance that are the effects of the present invention can be sufficiently obtained as long as the compound layer 2 is configured by the above-described phases.

The compound layer (first plating layer) 2 composed of the structure as described above is a relatively soft plating layer as compared to the aforementioned fine layer (second plating layer) 1. Specifically, a Vickers hardness of the compound layer 2 measured according to JIS Z2244 is 80 to 200 Hv in terms of average value. When the compound layer 2 is composed of the structure containing the MgZn phase, the quasicrystal phase, and the Mg phase and is a softer layer than the second plating layer, the effect of suppressing crack propagation inside the plating layer (that is, chipping resistance) as described later can be exhibited.

In the present invention, there is a feature in a thermal treatment method to be described later after formation of a plating alloy, and the plating layer configured by the fine layer 1 and the compound layer 2 can be formed by this thermal treatment method.

Hereinbefore, the plating layer of the quasicrystal-containing plated steel sheet according to this embodiment has been described in detail.

<Regarding Interface Alloy Layer>

Then, the interface alloy layer serving as the alloy layer of the quasicrystal-containing plated steel sheet according to this embodiment will be described in detail.

In this embodiment, as shown in FIG. 1, the interface alloy layer 3 formed from the Al—Fe intermetallic compound is formed at the interface between the plating layer, which is provided with the fine layer 1 and the compound layer 2, and the base steel sheet.

When Al is contained in the plating alloy at a suitable concentration range as described above and a suitable thermal treatment is performed after the formation of the plating alloy, the interface alloy layer 3 formed from the Al—Fe intermetallic compound can be formed at the side, which is closer to the steel sheet, of the compound layer 2 (that is, at the interface between the plating layer and the base steel sheet). This interface alloy layer 3 preferably contains at least one of $Al_3Fe$ (more specifically, $Al_{3.2}Fe$), $Fe_5Al_2$, and the like as the intermetallic compound. Since the Al—Fe intermetallic compound containing the above-described intermetallic compound has a complicate needle shape, binding force between the compound layer 2 at the upper layer and the base steel sheet is increased by the anchor effect to thereby improve adhesion and thus chipping resistance can be further improved. Further, it is found out that the Al—Fe intermetallic compound layer also affects adhesion of the plating layer as well as chipping resistance.

Herein, the thickness of the interface alloy layer 3 is not particularly limited, but is preferably set to 10 to 200 nm. Incidentally, since the thickness of the interface alloy layer 3 is less than 1 μm as described above, the existence of the interface alloy layer 3 is preferably confirmed by TEM observation or the like.

Incidentally, an oxide layer having a thickness of about less than 200 nm may be formed in the outermost layer of the plating layer. This oxide layer does not affect chipping resistance of the quasicrystal-containing plated steel sheet according to this embodiment, and thus is not particularly defined in the present invention.

<Regarding Confirmation Method of Metallic Structure>

Next, the confirmation method of various metallic structures in the plating layer of the quasicrystal-containing plated steel sheet according to this embodiment will be described.

The structure configuration of the plating layer can be confirmed in such a manner that a polishing sample piece or the structure of the cross section of the plating layer obtained by cross section polisher (CP) processing, focused ion beam (FIB) processing, or ion milling is observed with an optical microscope, an SEM, a TEM, or the like and then various analysis treatments are conducted thereon. Further, the structure in which the crystal grain size of the metallic structure is 1 μm or more can be measured by SEM observation, but the structure and quasicrystal phase in which the crystal grain size is less than 1 μm can be measured by TEM observation or the like as described above.

Further, the kind of phases in the fine layer 1 and the compound layer 2 can be confirmed by a known means such as an electron beam diffraction pattern of an EPMA or TEM.

Furthermore, in order to define the ratio of each phase in the structure configuring the plating layer, it is necessary to calculate the area ratio of a target phase on the basis of observation in a plurality of fields of view. Observation to determine the area ratio is preferably performed in, for example, at least arbitrary 10 or more fields of view. The entire cross section of an arbitrary plating layer is captured by an SEM or the like with about 1000 times magnification and a surrounded region is formed on the image for each structure by a known image process and a binarization process to measure the area ratio.

More specifically, for example, the metallic structure of the plating layer can be confirmed as follows. First, the quasicrystal-containing plated steel sheet is cut such that the cutting surface in which a cutting direction is parallel to the sheet thickness direction to become an observation surface, and then a sample is collected. The cutting surface of the obtained sample is subjected to polishing or CP processing. In the case of mechanical polishing, the polished cross section area is etched with nital. Thereafter, the obtained cross section is observed with an optical microscope, an SEM, or the like, and a metallic structure photograph is captured. Incidentally, the chemical composition of the constituent phase can be measured by analysis using an EDX or an EPMA as described above. From the chemical analysis result, the constituent phase can be simply identified. The area ratio of the constituent phase can be measured by binarizing the obtained metallic structure photograph, for example, and then measuring the area ratio of each portion of the plating layer by using image analysis. In addition, the average circle equivalent diameter can be calculated from the areas of the obtained individual regions (constituent phases). Alternatively, the area ratio and the average circle equivalent diameter of the constituent phase may be obtained by observing the metallic structure of the plating layer with an electron back scattering diffraction pattern (EBSD) method to identify the constituent phase.

In order to more specifically identify the constituent phase, the metallic structure of the plating layer is observed as follows. That is, the quasicrystal-containing plated steel sheet is cut such that the cutting surface in which a cutting direction is parallel to the sheet thickness direction becomes an observation surface, and then a thin sample is collected. The obtained thin sample is subjected to an ion milling method. Alternatively, the quasicrystal-containing plated steel sheet is subjected to FIB processing such that the cutting surface in which a cutting direction is parallel to the sheet thickness direction becomes an observation surface, and then a thin sample is picked out. The obtained thin sample is observed by using a TEM and a metallic structure photograph is captured. The constituent phase can be accurately identified by an electron beam diffraction image. In addition, the area ratio and the average circle equivalent diameter of the constituent phase can be obtained by subjecting the obtained metallic structure photograph to image analysis.

Incidentally, the existence of the constituent phase can also be confirmed most simply on the basis of the diffraction peak of XRD of the plating layer although a spatial existence form is not known.

Hereinbefore, the confirmation method of various metallic structures in the plating layer of the quasicrystal-containing plated steel sheet according to this embodiment has been described. Incidentally, needless to say, the above-described confirmation method can also be applied to confirmation of the structure of the interface alloy layer.

Incidentally, a chemical conversion treatment film layer can also be further formed on the plating layer of the quasicrystal-containing plated steel sheet according to this embodiment by performing an organic chemical conversion treatment or an inorganic chemical conversion treatment. Since a certain concentration or more of Zn is contained in the plating layer according to this embodiment, the plating layer can be subjected to the same phosphate chemical conversion treatment, chromate treatment, or chromate-free treatment as in the Zn-based plated steel sheet. Further, coating on the chemical conversion treatment film formed by such a chemical conversion treatment can be performed in the similar way to the Zn-based plated steel sheet. In addition, the quasicrystal-containing plated steel sheet according to this embodiment can be used as an original sheet of a laminate steel sheet.

<Regarding Expression Mechanism of Chipping Resistance>

As described above, in the quasicrystal-containing plated steel sheet according to the present invention, the structure of the plating layer is a multi-layered structure which is formed from the fine layer 1 positioned at the surface side of the plating layer (the surface layer side) and the compound layer 2 positioned at the side, which is closer to the base steel sheet, of the fine layer 1. By providing this plating layer having a multi-layered structure, cracks on the plating layer surface generated by an external pressure caused by chipping are difficult to reach the interface between the plating layer and the base steel sheet. Specifically, the relatively hard fine layer 1 positioned at the surface side of the plating layer is finely crushed by the external pressure; however, when the generated cracks reach the interface between the fine layer 1 and the compound layer 2, the cracks are propagated along the interface. That is, the cracks generated on the surface of the plating layer are not propagated to the relatively soft compound layer 2 and thus do not reach the interface between the plating layer and the base steel sheet. Therefore, even when the finely crushed fine layer 1 is peeled off by the generation of cracks and propagation of cracks, the compound layer 2 that is excellent in adhesion with the base steel sheet is less likely to be peeled off and thus the base steel sheet can be prevented from being exposed.

Figure 4:
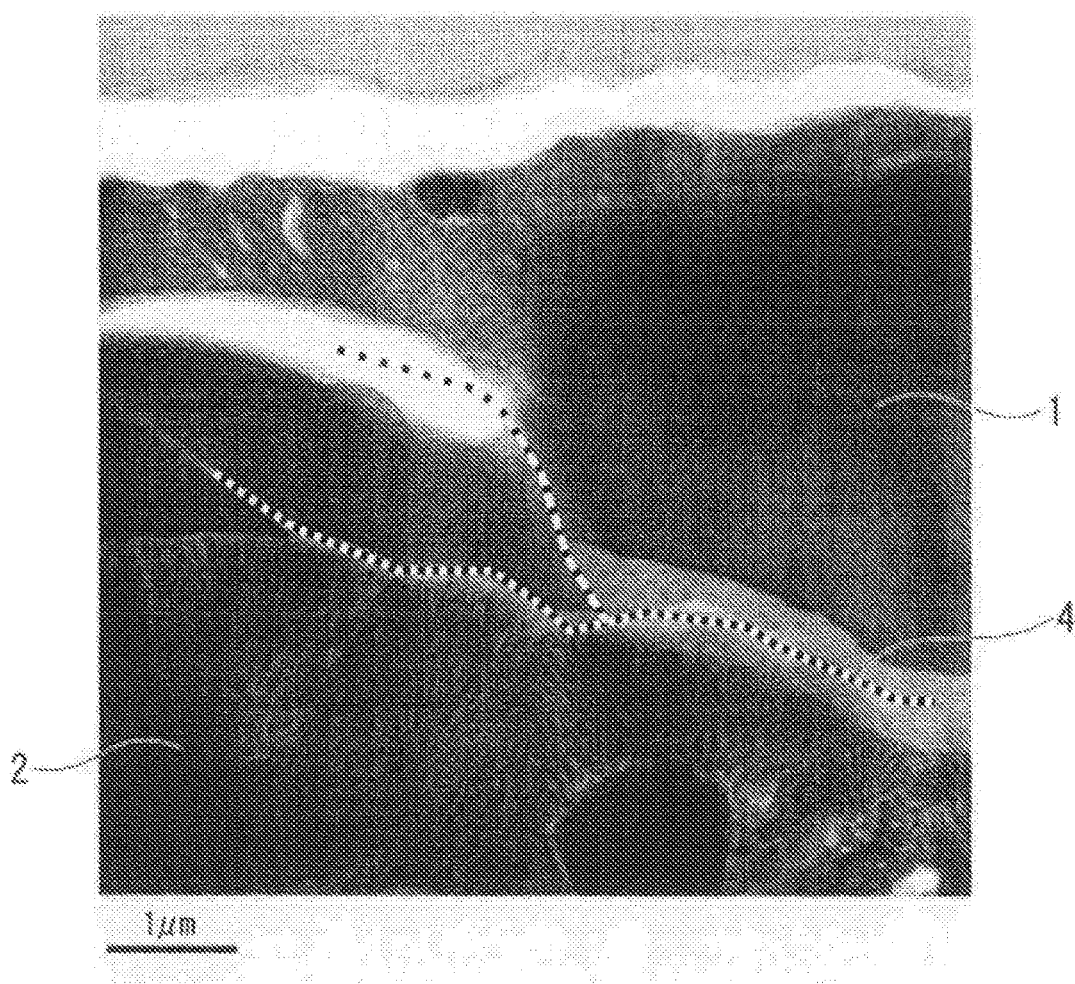
FIG. 4 is a cross-sectional TEM image of the plating layer shown in FIG. 1, and is the TEM image showing a state where a crack (chipping crack) 4 of the plating layer after a chipping test develops along an interface between a fine layer 1 and a compound layer 2.

Herein, an example in which a crack (chipping crack) 4 of the plating layer after the chipping test is developed along the interface between the fine layer 1 and the compound layer 2 is shown in FIG. 4. Also as understood from FIG. 4, when the plating layer has a multi-layered structure including the fine layer 1 and the compound layer 2, it is found out that cracks generated on the surface of the plating layer, that is, on the fine layer 1, are propagated along the interface between the fine layer 1 and the compound layer 2 and not propagated inside the compound layer 2 and do not reach the base steel sheet. Such specific propagation of cracks can be realized by making the plating layer have a multi-layered structure configuration as described in the present invention. For example, even when the compositions of the plating layer are the same compositions as in the present invention as described above, in a case where the plating layer has a single-layered structure, cracks are sequentially connected in the structure so that a large chipping trace remains and thus the exposed portion of the base steel sheet is increased in size.

Further, when Al is added into the plating layer and the interface alloy layer 3 is formed at the interface between the steel sheet and the plating layer by a suitable thermal treatment to be described later, the anchor effect to the compound layer 2 occurs in the quasicrystal-containing plated steel sheet. Accordingly, adhesion between the plating layer and the base steel sheet is further improved.

As described above, in the quasicrystal-containing plated steel sheet according to the present invention, chipping traces are not recognized even when a part of the plating layer is cracked and the remaining compound layer 2 exhibits the anticorrosive function so that red rust does not occur and the progress of corrosion is also suppressed.

Hereinbefore, the quasicrystal-containing plated steel sheet according to this embodiment has been described in detail.

(Regarding Production Method of Quasicrystal-Containing Plated Steel Sheet)

Next, the production method of the quasicrystal-containing plated steel sheet according to the present invention, particularly, the formation method of the plating layer will be described in detail.

In addition to the hot-dip plating method, a spraying method, a sputtering method, a vapor-deposition method, an electroplating method, or the like can be applied to formation of the plating layer. It is noted that the hot-dip plating method is most preferable in terms of cost when a plating layer having such a thickness that is generally used for automobiles or the like is formed.

Further, in order to control the plating layer to have the phase structure and the layer structure specified in the present invention, plating processing may be performed in a plurality of times under different conditions. However, in this embodiment, by performing a thermal treatment to be described later on the plating layer after the plating layer having homogeneous composition is formed first, the phase structure and the layer structure in the plating layer can be controlled to form a multi-layered structure and this is also advantageous in terms of cost, which is preferable. Also from this point of view, the hot-dip plating method is advantageous since a cooling process of the molten plating alloy can be utilized as the thermal treatment.

Incidentally, the same plating layer as the plating layer formed by the hot-dip plating method can also be formed in such a manner that a metal coating layer having a specific composition is formed on the surface of the steel sheet by vapor deposition or the like, then the steel sheet is heated by putting the steel sheet into a heating furnace so as to melt only the metal coating layer on the surface, and the thermal treatment is then performed in the subsequent cooling process. Incidentally, a person skilled in the art can easily devise the re-melting of the plating layer (the metal coating layer) in this way by optimizing the temperature and time since the melting point of the metal coating layer containing Mg and Zn as main composition is completely different from the melting point of the steel sheet serving as a base material. For example, when heating is performed at 500° C., the metal coating layer containing Mg and Zn as main compositions is completely melted but the base material is not melted. In particular, in rapid heating by using high temperature atmosphere, the surface of the steel sheet being in contact with the atmosphere is preferentially heated, and thus the rapid heating is advantageous in heating of only the coating layer on the surface.

Hereinafter, a method for making the phase structure of the plating layer have the configuration of the present invention by a thermal treatment will be described in detail.

In order to have the phase structure configuration of the present invention, first, a molten plating alloy having the aforementioned chemical composition is disposed on a base steel sheet (a plating step). A plating method usable in the plating step is as described above, but the hot-dip plating method is preferably employed. Subsequently, the plating alloy in a molten state positioned on the base steel sheet is cooled between 330 and 200° C. at a cooling rate of 10° C./sec or less (a first cooling step). Incidentally, when the hot-dip plating method is employed in the plating step, a first cooling process is performed immediately after the steel sheet is pulled up from a plating bath. When the cooling rate in this first cooling process is large, a large number of cracks are generated in the plating layer by internal stress associated with rapid solidification and chipping resistance is extremely decreased. In addition, when the cooling rate is too fast, a large amount of the quasicrystal phase is precipitated in the plating layer. Thus, in the subsequent heat process, the precipitation form of the quasicrystal phase and the plating layer structure cannot be maintained.

Since the generated cracks or coarse precipitates as described above are not disappeared until the plating layer is heated to a temperature equal to or higher than a melting point of the plating alloy so as to be melted again, therefore the generated cracks or coarse precipitates are not proper in the formation of the plating layer having a multi-layered structure. In particular, cracks disturb the homogenization of the structure inside the plating layer at the time of the subsequent thermal treatment, and thus a composite layer may not be formed. The formation of cracks extremely deteriorates corrosion resistance regarding the present invention, and accordingly, it is preferable to suppress the formation of cracks as much as possible.

Incidentally, from the viewpoint of further suppressing the generation of cracks on the surface of the plating layer, a cooling rate of the plating alloy in a molten state is preferably set to 8° C./sec or less.

Herein, the lower limit value of the cooling rate of the plating alloy is not particularly limited. As the cooling rate is slower, the generation of cracks on the surface of the plating layer can be suppressed more. However, the lower limit value may be appropriately determined also in consideration of operability such as cost.

Further, in the first cooling step, when the cooling attainment temperature is 330° C. or lower, the plating layer is completely solidified once. After the plating layer is completely solidified, a temperature increasing and holding step that is a reheating step of the plating layer as described later is performed. However, when the temperature increasing and holding step is performed without passing through the process of completely solidifying the plating layer (that is, in a state where the plating layer is not completely solidified), the layer is filled with coarse sphere shape quasicrystals, dispersed MgZn phase and $Mg_{51}Zn_{20}$. Thus, the compound layer 2 is extremely difficult to form. Further, a large number of cracks tend to occur in the plating layer. For this reason, it is important to set the cooling attainment temperature when the plating alloy in a molten state is cooled to 330° C. or lower.

Incidentally, from the viewpoint of stably forming the compound layer 2, the cooling attainment temperature is preferably set to 300° C. or lower and further preferably set to 250° C. or lower. On the other hand, when cooling is performed while the cooling attainment temperature is set to lower than 200° C., the surface structure of the plating layer is gotten rough in the subsequent temperature increasing and holding step, and thus the surface appearance tends to deteriorate. Therefore, the cooling attainment temperature is preferably set to 200° C. or higher. In addition, when cooling is performed while the cooling attainment temperature is set to lower than 200° C., the quasicrystal phase is precipitated and grown in the plating layer more than necessary, and thus a coarse quasicrystal phase is likely to be mixed in the fine layer. Since the control of the subsequent structure configuration may be slightly difficult, also from this viewpoint, the cooling attainment temperature is preferably set to 200° C. or higher.

However, even when the cooling attainment temperature is lower than 200° C. in the first cooling step, this cooling attainment temperature does not affect plating performance itself; there is a means for solving the aforementioned rough surface structure by skin pass rolling in some degree, and thus the aforementioned problem in appearance of the plating layer after cooling can be solved. Therefore, the lower limit of the cooling attainment temperature in the first cooling step is not necessary to be limited as strict as in the upper limit of the cooling attainment temperature. For example, the molten plating layer subjected to cooling to room temperature can obtain the structure configuration of the present invention as long as the conditions of the subsequent thermal treatment are satisfied.

Next, the plated steel sheet subjected to cooling in the first cooling step is heated again up to the temperature increasing range of 350° C. to 400° C. at an average heating rate (an average temperature increasing rate) of 10° C./sec to 50° C./sec and then held for 5 seconds to 30 seconds in such a temperature range (a temperature increasing and holding step). When the plating layer is heated again up to such a temperature range and then held, the solidified state inside the plating layer is changed to the semi-molten state and the structure precipitated in the first cooling step is almost reset (provided that, depending on circumstances, the quasicrystal phase formed in the first cooling step slightly remains). In the temperature range of 350° C. to 400° C., the structure state almost close to the liquid phase with no specific precipitated phase. Further, cracks generated in the first cooling step are also recovered in a certain degree.

In this temperature range of 350° C. to 400° C., first, the MgZn phase is precipitated from the interface of the base steel sheet and then the Mg phase and the quasicrystal phase are sequentially grown to thereby form the compound layer 2 having these composite phases. The material in which the structure is most easily grown in this temperature range is MgZn, and as a result of composition segregation and separation by MgZn precipitation, the dendritic quasicrystal is thereafter precipitated and the structure configuration in which Mg covers voids of the dendritic shape is obtained.

Incidentally, when the average heating rate is less than 10° C./sec that is excessively small, the MgZn phase precipitated from the interface of the base steel sheet is coarsened too much and thus the compound layer 2 does not have composite phases. In addition, cracks formed in the first cooling step tend to remain without any change. Further, when the average heating rate is more than 50° C./sec that is excessively large, there is a technical difficulty in terms of temperature control because the temperature increasing range is narrow.

On the other hand, when the holding time is shorter than 5 seconds, the generation of composite phases in the compound layer 2 is not sufficient and thus chipping resistance cannot be sufficiently improved. In addition, when the holding time is longer than 30 seconds, the ratio of the compound layer 2 in the plating layer is increased too much and thus it is difficult to sufficiently generate the fine layer 1 in the second cooling step to be described later. Also in this case, the composite layer is not formed and chipping resistance cannot be sufficiently improved.

In order to control the crystal grain size of MgZn, that is, to control the thickness of the compound layer, the holding time at a range of 350° C. to 400° C. is preferably about 10 seconds to 20 seconds. As the holding time is lengthened, $MgZn_2$ tends to be grown.

In this way, when both the increasing temperature in a range of 350° C. to 400° C. and the holding time at such an increasing temperature do not satisfy the above-described condition, the composite phases are not sufficiently grown in the compound layer 2 and chipping resistance is not sufficiently improved. In addition, when both the increasing temperature and the holding time do not satisfy the above-described condition, the surface structure of the plating layer is disturbed and the surface appearance tends to deteriorate. Therefore, it is very important to control the increasing temperature and the holding time in the re-heating.

Incidentally, an Mg—MgZn eutectic composition exists at a temperature of 350° C., and when the temperature is higher than 350° C., a liquid phase appears in the plating layer. However, when the temperature is higher than 400° C., the plating layer is in a completely molten state, and there is a concern that the quality of base iron. In addition, MgZn is extremely grown and thus the composite layer structure is not formed any more. Further, when quenching is performed in the subsequent process, a large number of cracks may be generated because the temperature is too high. Furthermore, when the temperature is higher than 400° C., since the plated surface is gotten rough in the course of the subsequent temperature process, therefore the upper limit temperature is preferably 400° C. or lower. Moreover, when the temperature is higher than 400° C., alloying reaction between Al and Fe or Zn and Fe may cause compositions change of the plating structure. Therefore, in order to put the plating layer in a semi-molten state, it is a very important condition that the temperature increasing range is controlled to be within a range of 350° C. to 400° C.

Further, in the temperature increasing and holding step, the counting of holding time is started from a time point when the temperature reaches 350° C.

After the temperature increasing and holding step, the plated steel sheet is cooled (quenched) at an average cooling rate of 20° C./sec or more (a second cooling step). According to this step, the plating layer surface region in a semi-molten state in the temperature increasing and holding step is solidified from a liquid phase and the fine layer 1 formed from a microstructure in which the maximum grain size (circle equivalent diameter) is 1 μm or less is formed without precipitating the Mg phase of equilibrium phase. When the average cooling rate is less than 20° C./sec, a large amount of the Mg phase is precipitated to the plating layer surface and thus corrosion resistance extremely deteriorates.

Herein, the upper limit value of the average cooling rate in the second cooling step is not particularly limited, but may be set to, for example, about 2000° C./sec. The cooling rate on the plated surface at the time of being submerged is approximately 2000° C./sec, and at this time, the formation of the composite phase disclosed in the present invention is confirmed. As the cooling rate increases, the hardness of the fine layer is increased. When abrasion resistance and scratch resistance are intended to be improved, the cooling rate during the second cooling step may be increased as much as possible. In general, when a coarse quasicrystal is mixed, the hardness tends to partially increase, but an increase in average value of hardness is slight and thus scratch resistance is not changed much.

Incidentally, as an actual measurement method of a temperature of the plating layer when the quasicrystal-containing plated steel sheet according to this embodiment is produced, for example, a contact-type thermocouple (K-type) may be used. When the contact-type thermocouple is attached to the base steel sheet, the average temperature of the entire plating layer can be monitored at all times. Further, when various rates and the thickness are mechanically controlled, and various operation conditions such as the preheating temperature of the steel sheet and the temperature of the hot-dip plating bath are unified, it is possible to know accurately the temperature of the entire production process of plating layer at the time point under such production conditions. For these reasons, the cooling treatment in the first cooling step and the second cooling step and the heating treatment in the temperature increasing and holding step can be precisely controlled. Incidentally, although being not as accurate as the contact type, a non-contact-type radiation thermometer may be used to measure the surface temperature of the plating layer.

Further, a relation between the surface temperature of the plating layer and the average temperature of the entire plating layer may be obtained by simulation in which heat conduction analysis is performed. Specifically, the surface temperature of the plating layer and the average temperature of the entire plating layer are obtained on the basis of various production conditions such as the preheating temperature of the steel sheet, the temperature of the hot-dip plating bath, the speed of pulling the steel sheet up from the plating bath, the thickness of the steel sheet, the thickness of the plating layer, the heat quantity of thermal exchange between the plating layer and a production facility, and the radiation amount of the plating layer. Thereafter, using the obtained results, the relation between the surface temperature of the plating layer and the average temperature of the entire plating layer may be obtained. Accordingly, the average temperature of the entire plating layer at the time point under such production conditions can be estimated by actually measuring the surface temperature of the plating layer when the quasicrystal-containing plated steel sheet is produced. As a result, the cooling treatment in the first cooling step and the second cooling step and the heating treatment in the temperature increasing and holding step can be precisely controlled.

Incidentally, when the hot-dip plating method is employed in the plating step, in order to perform hot-dip plating, the temperature of the plating bath is generally set to a temperature around a melting point of the plating alloy (in the plating composition according to the present invention, 440 to 540° C.)+40° C. For this reason, in the present invention in which Al is contained in the plating alloy, Al instantly moves to the interface between the plating layer and the base steel sheet at the time point when a plating original sheet is first immersed in the plating bath and then the interface alloy layer formed from the Al—Fe intermetallic compound is formed. Once this interface alloy layer is formed, the interface alloy layer is not eliminated by the thermal treatment to be performed thereafter since the melting point of the Al—Fe intermetallic compound configuring the interface alloy layer is high.

Hereinafter, a case where the hot-dip plating method is employed in the plating step of the production method of the plated steel sheet of the present invention will be described.

When a material for the plating alloy is prepared, it is preferable to prepare a material as an alloy material by using pure metal (purity: 99% or more). First, a predetermined amount of alloy metal is mixed such that the above-described plating layer composition is obtained, and then the alloy metal is completely melted in a vacuum or inert gas-substituted state by using a high-frequency induction furnace, an arc furnace, or the like to obtain an alloy. Further, the alloy mixed at a predetermined composition (the above-described plating layer composition) is melted in the atmosphere and then the obtained molten product is used as a plating bath.

Herein, the bath temperature of the plating bath is preferably in a temperature range higher than the melting point of the plating alloy by about 40° C. from the viewpoint of general plating operability as described above, and is preferably set to 550° C. or lower, for example, 480° C. to 520° C.

Incidentally, there is no particular limitation of using pure metal in preparing of the plating alloy as described above, and existing Zn alloy, Mg alloy, and Al alloy may be melted and then used. At this time, there is no problem if an alloy with a predetermined composition having few impurities is used.

Further, when the hot-dip plating method is employed, a known method such as a Sendzimir method, a preplating method, a two-stage plating method, or a flux method can be employed. Preplating processing such as Ni preplating or Cu preplating may also be employed as preprocessing before the plating step of forming the plating layer according to the present invention. Incidentally, when a plating means such as vapor deposition or sputtering is applied to the plating step, the preprocessing as described above is not necessary and a plating layer of an alloy with a predetermined composition may be formed on the steel sheet.

Furthermore, when the hot-dip plating method is applied to the plating step, general plating operation conditions may be employed except that the attention is paid to the aforementioned thermal treatment, and special facilities and conditions are not particularly necessary. For example, when the hot-dip plating method is employed in the plating step, the steel sheet is immersed in the plating bath, the coating amount is adjusted by wiping using $N_2$ gas, and then the first cooling step may be performed by $N_2$ gas cooling or natural cooling.

Further, regarding the heating and cooling facility for the thermal treatment, special facilities and conditions are not particularly necessary. For example, in the heating treatment or the reheating treatment, operation conditions of the facility may be appropriately set to satisfy the above-described thermal treatment conditions by using a known facility such as an induction heating (IH) furnace or an infrared heating furnace. Furthermore, in the cooling treatment, a generally known method such as $N_2$ gas cooling, mist cooling, or submerging can be employed. As the cooling gas, in addition to the $N_2$ gas, a gas having a high effect of dispelling heat such as He gas or hydrogen gas may be used.

Hereinbefore, the production method of the quasicrystal-containing plated steel sheet according to this embodiment has been described in detail.

(Regarding Evaluation Method of Properties of Quasicrystal-Containing Plated Steel Sheet)

Next, the evaluation method of excellent corrosion resistance and chipping resistance exhibited by the quasicrystal-containing plated steel sheet according to this embodiment will be simply described.

<Evaluation Method of Corrosion Resistance>

In order to evaluate corrosion resistance of the quasicrystal-containing plated steel sheet, it is most preferable to perform an exposure test capable of evaluating corrosion resistance of the plating layer in an actual environment. The relative merits of corrosion resistance can be evaluated by evaluating a corrosion weight loss of the plating layer during a set time period.

When corrosion resistance of the plating layer having high corrosion resistance is compared, it is preferable to perform a long-term corrosion resistance test. The corrosion resistance is evaluated on the basis of the length of the period until red rust is generated. Further, when the corrosion resistance is evaluated, it is also important to consider the period of time of protection of the steel sheet.

In order to more simply evaluate corrosion resistance, a corrosion acceleration test such as a composite cycle corrosion test or a hot water spray test can be used. The relative merits of corrosion resistance can be determined by evaluating the corrosion weight loss or the period of time for preventing red rust. Incidentally, when corrosion resistance of the plating layer having high corrosion resistance is compared, it is preferable to perform a corrosion acceleration test using a high-concentration (for example, around 5%) NaCl aqueous solution. When a low-concentration (for example, 1% or less) NaCl aqueous solution is used, the relative merits of corrosion resistance are difficult to determine.

<Evaluation Method of Chipping Resistance>

In order to evaluate chipping resistance of the quasicrystal-containing plated steel sheet, for example, it is preferable to perform a method in which the peeled-off area of the plating layer occurred by using a gravelo test machine is visually evaluated. Test conditions may be appropriately set, but for example, conditions such as "100 g of No. 7 crushed stone is crashed on the plating layer cooled to −20° C. at an angle of 90 degrees from a distance of 30 cm under an air pressure of 3.0 kg/cm$^2$ by using a gravelometer" may be employed.

Incidentally, regarding the evaluation of chipping resistance, as compared to the evaluation on the plated steel sheet without any change, it is more preferable to perform evaluation on the plated steel sheet which is subjected to electrodeposition coat, intermediate coat, and topcoat after a phosphate chemical conversion treatment since this evaluation is close to the actual use state.

<Evaluation Method of Area Ratio>

Further, the area ratio of MgZn contained in each plating layer may be evaluated according to the following method in such a manner that a target phase is identified as MgZn by TEM electron beam diffraction and then the field of view is replaced with the field of view under an SEM. That is, an image obtained from the field of view under an SEM is binarized to a monochrome image and then an area of the MgZn phase with respect to the entire plating layer may be calculated by a computer image process.

<Evaluation Method of Hardness of Plating Layer>

As the evaluation method of the hardness of the plating layer, it is simple to prepare a plating layer having a thickness of 10 μm or more and measure a Vickers hardness from the surface. It is noted that in this method, if the plating layer does not have a certain level of plating thickness, the hardness evaluation is susceptible to the hardness of the base iron, the interface alloy layer, or the compound layer, and thus attention should be paid to the evaluation method. When the plating layer has a certain level of plating thickness, the hardness of the plating layer at the outermost surface layer is measured. As the hardness of the plating layer is higher, generally, it can be determined that abrasion resistance is more excellent. More preferably, the cross section of the plating layer is collected and then the hardness for each phase is evaluated by a nano indenter or the like.

<Evaluation Method of Plating Adhesion>

When adhesion of the plating layer is evaluated, generally, evaluation is performed by peeling off a tape on a convexo-concave portion after the ball impact test. As the peeling amount is smaller, adhesion is more excellent. In addition, adhesion can be similarly evaluated by evaluating the tape peeling on a processed portion after a V-bending test, a T-bending test, and an Erichsen test.

Hereinbefore, the evaluation method of properties exhibited by the quasicrystal-containing plated steel sheet according to this embodiment has been simply described.

EXAMPLES

Hereinafter, the effects of the present invention will be described using Examples, but the present invention is not limited to conditions used in the following Examples.

First, as materials of plating alloys, ingots having chemical compositions presented in Table 1 to Table 8 were prepared to prepare plating baths. Further, a cold-rolled steel sheet (thickness: 0.6 mm) was used as an original sheet of a plated steel sheet (a plating original sheet). This cold-rolled steel sheet was cut into 10 cm×17 cm and then was plated by a batch type hot-dip plating test apparatus manufactured by Nippon Steel & Sumitomo Metal Corporation. Incidentally, as the cold-rolled steel sheet, general low carbon steel (C: 0.1% or less, Si: 0.01% or less, Mn: 0.2% or less, P and S: 0.03% or less, Fe: balance) was employed.

Further, blank spaces in the chemical compositions of the plating alloys indicate that the corresponding chemical composition is intentionally not added.

Hereinafter, the formation method of the plating layer in this Example will be described in detail.

First, after the plating original sheet was reduced and annealed for 1 minute at 800° C. in 5% $H_2$—$N_2$ atmosphere, the plating original sheet was immersed in the plating bath set at the original sheet melting point+40° C. and pulled up from the plating bath, and then the coating amount was adjusted by wiping using $N_2$ gas (a plating step).

Specific temperature of the plating bath and temperature history of the subsequent plating production are presented in detail in Table 9 to Table 12.

TABLE 1

| Classification | No. | Plating layer Chemical composition of plating layer (at %) |||||||||||||
|---|---|---|---|---|---|---|---|---|---|---|---|---|---|
| | | Zn at % | Al at % | Ca at % | Y at % | La at % | Ce at % | Si at % | Ti at % | Cr at % | Fe at % | Co at % | Ni at % | V at % |
| Comparative Example | 1 | 28 | 3 | 2 | 0.5 | | | | | | | | | |
| Example | 1 | 28.5 | 4 | 1.5 | 0.1 | | 0.2 | | | | | | | |
| Example | 2 | 30 | 5 | 1 | 0.1 | | | | 0.1 | 0.1 | | | | |
| Comparative Example | 2 | 30 | 10 | 2.9 | | | | | | | | | | |
| Example | 3 | 30 | 6 | 1 | | | | | | | 0.3 | | | |
| Example | 4 | 30 | 4 | 3.5 | | | | | 0.1 | | | | | |
| Comparative Example | 3 | 30 | 2 | 3.7 | | | | | | | | | | |
| Comparative Example | 4 | 30 | 4 | | 3.7 | | | | | | | | | |
| Comparative Example | 5 | 30 | 6 | | | 3.7 | | | | | | | | |
| Comparative Example | 6 | 30 | 8 | | | | 3.7 | | | | | | | |
| Comparative Example | 7 | 31 | 13 | 0.8 | | | 1.1 | | | | | | | |
| Example | 5 | 31 | 8 | | | | | | | | | | | 0.5 |
| Example | 6 | 32 | 4 | 2 | | | | 0.1 | | | | | | |
| Example | 7 | 32 | 3 | 1.1 | 0.1 | | 0.1 | | | | | | | |
| Comparative Example | 8 | 32 | 8 | | | 0.2 | | | | | | | | |

TABLE 2

| Classification | No. | Plating layer Chemical composition of plating layer (at %) |||||||||||||
|---|---|---|---|---|---|---|---|---|---|---|---|---|---|
| | | Zn at % | Al at % | Ca at % | Y at % | La at % | Ce at % | Si at % | Ti at % | Cr at % | Fe at % | Co at % | Ni at % | V at % |
| Example | 8 | 33 | 12 | 2.5 | | | | | | 0.5 | | | | |
| Example | 9 | 33 | 5 | 1.9 | | | 0.1 | | | | | | | |
| Example | 10 | 33 | 3 | 1.8 | | | | | | | | | | |
| Example | 11 | 33 | 6 | 2.7 | | | | | | | | | | |
| Example | 12 | 34 | 6 | 3 | | | | | | | | | | |
| Example | 13 | 34 | 4 | 2 | | | | | | | | | | |
| Example | 14 | 35 | 10 | 3.2 | | | | | 0.1 | | | | | |
| Example | 15 | 35 | 6 | 1.5 | | | | | | | | | 0.5 | |

TABLE 2-continued

| Classification | No. | Plating layer Chemical composition of plating layer (at %) | | | | | | | | | | | | |
|---|---|---|---|---|---|---|---|---|---|---|---|---|---|---|
| | | Zn at % | Al at % | Ca at % | Y at % | La at % | Ce at % | Si at % | Ti at % | Cr at % | Fe at % | Co at % | Ni at % | V at % |
| Example | 16 | 35 | 4 | | | 0.8 | | | | | | | 0.4 | |
| Example | 17 | 35 | 3 | 1.3 | | | 0.1 | | | | | | | |
| Example | 18 | 36 | 7 | 1.7 | | | | | | | | | | |
| Comparative Example | 9 | 36 | 11 | 3 | | | | | | | | | | |
| Example | 19 | 36 | 4 | 2 | | | 0.1 | | | | | | | |
| Example | 20 | 37 | 2 | 2.5 | | | | 0.5 | | | | | | |
| Example | 21 | 37 | 5 | 1.5 | 0.1 | | | | | | | | | |

TABLE 3

| Classification | No. | Plating layer Chemical composition of plating layer (at %) | | | | | | | | | | | | |
|---|---|---|---|---|---|---|---|---|---|---|---|---|---|---|
| | | Zn at % | Al at % | Ca at % | Y at % | La at % | Ce at % | Si at % | Ti at % | Cr at % | Fe at % | Co at % | Ni at % | V at % |
| Comparative Example | 10 | 37 | 7 | 2.6 | | | | | | | | | | |
| Example | 22 | 38 | 8 | 1 | | 0.1 | | | | | | | | |
| Example | 23 | 38 | 3 | 1.1 | 0.1 | | | | | | | | | |
| Example | 24 | 38 | 5 | 2 | 0.1 | | | | | | | | | |
| Comparative Example | 11 | 38 | 9 | | 2 | | | | | | | | | |
| Example | 25 | 38 | 7 | 1.8 | 1 | | | | | | | | | |
| Example | 26 | 39 | 0.3 | 1.6 | 0.1 | | | | | | | | | |
| Example | 27 | 39 | 3 | 1.9 | | | | | | | | | | |
| Example | 28 | 40 | 5 | 0.9 | | 0.1 | | | | | | | | |
| Example | 29 | 41 | 0.8 | 1.3 | 0.1 | 0.1 | | | | | | | | |
| Example | 30 | 41 | 10 | | | | 3 | | | | | | | |
| Comparative Example | 12 | 41 | 6 | 3 | | 0.2 | | | | | | | | |
| Example | 31 | 42 | 4 | 2.2 | | | | | 0.2 | | | | | |
| Example | 32 | 42 | 5 | 0.8 | | | | | | | | 0.2 | | |
| Example | 33 | 43 | 2 | 2.6 | | | | | | | | | | |

TABLE 4

| Classification | No. | Plating layer Chemical composition of plating layer (at %) | | | | | | | | | | | | |
|---|---|---|---|---|---|---|---|---|---|---|---|---|---|---|
| | | Zn at % | Al at % | Ca at % | Y at % | La at % | Ce at % | Si at % | Ti at % | Cr at % | Fe at % | Co at % | Ni at % | V at % |
| Example | 34 | 44 | 6 | 0.8 | 0.1 | 0.1 | | 0.2 | | 0.3 | | | | |
| Example | 35 | 45 | 8 | 0.6 | | | | 0.1 | 0.1 | | | | | |
| Comparative Example | 13 | 45 | 0.5 | 2 | | | | | | | | | | |
| Example | 36 | 45 | 3 | 1 | | | 0.1 | | | | | | 0.1 | 0.4 |
| Example | 37 | 46 | 1 | 0.3 | | 0.1 | | | | | | | | |
| Comparative Example | 14 | 47 | 0.2 | 1.2 | | 0.1 | 0.1 | | | | | | | |
| Example | 38 | 48 | 3 | 1.1 | | 0.1 | | | | | | | | |
| Example | 39 | 50 | 2 | 2.7 | | | | | | 0.1 | | | | |
| Comparative Example | 15 | 51 | 2 | 0.8 | | | | | | | | | | |
| Comparative Example | 16 | 30 | 5 | 2 | | | | | | | | | | |
| Comparative Example | 17 | 35 | 5 | 2 | | | | | | | | | | |
| Comparative Example | 18 | 40 | 5 | 2 | | | | | | | | | | |
| Comparative Example | 19 | 45 | 5 | 2 | | | | | | | | | | |
| Comparative Example | 20 | 50 | 5 | 2 | | | | | | | | | | |
| Comparative Example | 21 | 70.8 | 22 | | | | | 0.2 | | | | | | |
| Comparative Example | 22 | Commercially available hot-dip Zn-plated steel sheet | | | | | | | | | | | | |

TABLE 5

Plating layer
Chemical composition of plating layer (at %)

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn ÷ Al | Value of Ca ÷ Zn |
|---|---|---|---|---|---|---|---|---|---|---|---|---|---|
| Comparative Example | 1 | | | | | | | | 66.5 | 2.5 | 0 | 9.3 | 0.7 |
| Example | 1 | | | | | | 0.5 | | 65.2 | 1.8 | 0 | 7.1 | 0.4 |
| Example | 2 | | | 0.1 | | 0.25 | | | 63.4 | 1.1 | 0.2 | 6.0 | 0.2 |
| Comparative Example | 2 | | | | | | | | 57.1 | 2.9 | 0 | 3.0 | 0.3 |
| Example | 3 | | | | | | | 0.1 | 62.6 | 1.0 | 0 | 5.0 | 0.2 |
| Example | 4 | | | | | | | | 62.4 | 3.5 | 0.1 | 7.5 | 0.9 |
| Comparative Example | 3 | | | | 0.1 | 0.1 | | | 64.1 | 3.7 | 0 | 15.0 | 1.9 |
| Comparative Example | 4 | | | | | 0.15 | | | 62.2 | 3.7 | 0 | 7.5 | 0.0 |
| Comparative Example | 5 | | | | | | | | 60.3 | 3.7 | 0 | 5.0 | 0.0 |
| Comparative Example | 6 | | 0.1 | | | | | | 58.2 | 3.7 | 0 | 3.8 | 0.0 |
| Comparative Example | 7 | | | | | | | | 54.1 | 1.9 | 0 | 2.4 | 0.1 |
| Example | 5 | | | | | | | | 60.5 | 0.0 | 0 | 3.9 | 0.0 |
| Example | 6 | | | | | 0.005 | 0.005 | 0.1 | 61.8 | 2.1 | 0 | 8.0 | 0.5 |
| Example | 7 | | | | | | | | 63.7 | 1.3 | 0 | 10.7 | 0.4 |
| Comparative Example | 8 | | | | | | | | 59.8 | 0.2 | 0 | 4.0 | 0.0 |

TABLE 6

Plating layer
Chemical composition of plating layer (at %)

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn ÷ Al | Value of Ca ÷ Zn |
|---|---|---|---|---|---|---|---|---|---|---|---|---|---|
| Example | 8 | | | | | | | | 52.0 | 2.5 | 0.5 | 2.8 | 0.2 |
| Example | 9 | | | | | 0.005 | | | 60.0 | 2.0 | 0 | 6.6 | 0.4 |
| Example | 10 | | | | | | | | 62.2 | 1.8 | 0 | 11.0 | 0.6 |
| Example | 11 | | | | | | | | 58.3 | 2.7 | | 5.5 | 0.5 |
| Example | 12 | | | | | | | | 57.0 | 3.0 | 0 | 5.7 | 0.5 |
| Example | 13 | | | | | | | | 60.0 | 2.0 | 0 | 8.5 | 0.5 |
| Example | 14 | | | | | | | | 51.7 | 3.2 | 0.1 | 3.5 | 0.3 |
| Example | 15 | | | | | | | | 57.0 | 1.5 | 0 | 5.8 | 0.3 |
| Example | 16 | | | | | | | | 59.8 | 0.8 | 0 | 8.8 | 0.0 |
| Example | 17 | | | | | 0.1 | | | 60.5 | 1.4 | 0 | 11.7 | 0.4 |
| Example | 18 | | | | | | | | 55.3 | 1.7 | 0 | 5.1 | 0.2 |
| Comparative Example | 9 | | | | | | | | 50.0 | 3.0 | | 3.3 | 0.3 |
| Example | 19 | | | | | | 0.2 | | 57.7 | 2.1 | 0 | 9.0 | 0.5 |
| Example | 20 | | | | | | | | 58.0 | 2.5 | 0.5 | 18.5 | 1.3 |
| Example | 21 | | | | | | | | 56.4 | 1.6 | 0 | 7.4 | 0.3 |

TABLE 7

Plating layer
Chemical composition of plating layer (at %)

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn ÷ Al | Value of Ca ÷ Zn |
|---|---|---|---|---|---|---|---|---|---|---|---|---|---|
| Comparative Example | 10 | | | | | | | | 53.4 | 2.6 | | 5.3 | 0.4 |
| Example | 22 | | | | | | | | 52.9 | 1.1 | 0 | 4.8 | 0.1 |
| Example | 23 | | | | | | | | 57.8 | 1.2 | 0 | 12.7 | 0.4 |
| Example | 24 | | | | | 0.1 | | | 54.8 | 2.1 | 0 | 7.6 | 0.4 |
| Comparative Example | 11 | | | | | | | | 51.0 | 2.0 | | 4.2 | 0.0 |
| Example | 25 | | | | | | | | 52.2 | 2.8 | | 5.4 | 0.3 |
| Example | 26 | | | | | | | | 59.0 | 1.7 | 0 | 130.0 | 5.3 |
| Example | 27 | | | | | | | 0.5 | 55.6 | 1.9 | 0 | 13.0 | 0.6 |

TABLE 7-continued

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn ÷ Al | Value of Ca ÷ Zn |
|---|---|---|---|---|---|---|---|---|---|---|---|---|---|
| Example | 28 | | 0.1 | 0.1 | | | | | 53.8 | 1.0 | 0 | 8.0 | 0.2 |
| Example | 29 | | | | | | | | 56.7 | 1.5 | 0 | 51.3 | 1.6 |
| Example | 30 | 0.5 | | | | | | | 45.5 | 3.0 | 0 | 4.1 | 0.0 |
| Comparative Example | 12 | | | | | | | | 49.8 | 3.2 | 0 | 6.8 | 0.5 |
| Example | 31 | | | | | | | | 51.6 | 2.2 | 0.2 | 10.5 | 0.6 |
| Example | 32 | | | 0.4 | | | | | 51.6 | 0.8 | 0 | 8.4 | 0.2 |
| Example | 33 | | | | | | | | 52.4 | 2.6 | 0 | 21.5 | 1.3 |

TABLE 8

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn ÷ Al | Value of Ca ÷ Zn |
|---|---|---|---|---|---|---|---|---|---|---|---|---|---|
| Example | 34 | | | | | | | | 48.5 | 1.0 | 0.5 | 7.3 | 0.1 |
| Example | 35 | | | | | | | | 46.2 | 0.6 | 0.2 | 5.6 | 0.1 |
| Comparative Example | 13 | | | | | | | | 52.5 | 2.0 | 0 | 90.0 | 4.0 |
| Example | 36 | | | | | | | | 50.4 | 1.1 | 0 | 15.0 | 0.3 |
| Example | 37 | | | | | 0.2 | | | 52.4 | 0.4 | 0 | 46.0 | 0.3 |
| Comparative Example | 14 | | 0.2 | | | 0.4 | | | 50.8 | 1.4 | 0 | 235.0 | 6.0 |
| Example | 38 | | 0.5 | | | | | | 47.3 | 1.2 | 0 | 16.0 | 0.4 |
| Example | 39 | | | | 0.2 | | | | 45.0 | 2.7 | 0.1 | 25.0 | 1.4 |
| Comparative Example | 15 | | | | | | | | 46.2 | 0.8 | 0 | 25.5 | 0.4 |
| Comparative Example | 16 | | | | | | | | 63.0 | 2.0 | 0 | 6.0 | 0.4 |
| Comparative Example | 17 | | | | | | | | 58.0 | 2.0 | 0 | 7.0 | 0.4 |
| Comparative Example | 18 | | | | | | | | 53.0 | 2.0 | 0 | 8.0 | 0.4 |
| Comparative Example | 19 | | | | | | | | 48.0 | 2.0 | 0 | 9.0 | 0.4 |
| Comparative Example | 20 | | | | | | | | 43.0 | 2.0 | 0 | 10.0 | 0.4 |
| Comparative Example | 21 | | | | | | | | 7.0 | 0.0 | 0.2 | 3.2 | 0.0 |
| Comparative Example | 22 | Commercially available hot-dip Zn-plated steel sheet | | | | | | | | | | | |

TABLE 9

| Classification | No. | Plating bath temperature ° C. | Plating thickness μm | Plating atmosphere | Immersion time of steel sheet sec | Achieving temperature of first cooling step ° C. | Cooling rate of first cooling step ° C./sec |
|---|---|---|---|---|---|---|---|
| Comparative Example | 1 | 350 | 12 | under normal atmosphere | 3 | 320 | 8 |
| Example | 1 | 350 | 10 | under normal atmosphere | 3 | 250 | 7 |
| Example | 2 | 360 | 13 | under normal atmosphere | 3 | 300 | 8 |
| Comparative Example | 2 | 410 | 12 | under normal atmosphere | 3 | 300 | 7 |
| Example | 3 | 360 | 20 | under normal atmosphere | 3 | 230 | 9 |
| Example | 4 | 350 | 15 | under normal atmosphere | 5 | 210 | 10 |
| Comparative Example | 3 | 350 | 10 | under normal atmosphere | 3 | 320 | 9 |
| Comparative Example | 4 | 350 | 15 | under normal atmosphere | 1 | 330 | 9 |
| Comparative Example | 5 | 380 | 15 | under normal atmosphere | 5 | 280 | 8 |
| Comparative Example | 6 | 400 | 20 | under normal atmosphere | 3 | 290 | 7 |
| Comparative Example | 7 | 430 | 15 | under normal atmosphere | 5 | 210 | 10 |
| Example | 5 | 400 | 30 | under nitrogen atmosphere | 3 | 300 | 10 |
| Example | 6 | 400 | 14 | under normal atmosphere | 1 | 270 | 10 |
| Example | 7 | 400 | 25 | under normal atmosphere | 5 | 260 | 8 |
| Comparative Example | 8 | 410 | 10 | under normal atmosphere | 3 | 260 | 9 |

TABLE 9-continued

| | | | Production conditions | | | | |
|---|---|---|---|---|---|---|---|
| | | | Temperature increasing step | | | Second cooling step | |
| | | | | | Temperature | | |
| Classification | No. | Heating temperature ° C. | Holding time sec | increasing rate up to heating temperature ° C./sec | Temperature of cooling completion ° C. | Cooling rate ° C./sec |
|---|---|---|---|---|---|---|
| Comparative Example | 1 | 360 | 10 | 15 | 30 | 200 |
| Example | 1 | 400 | 12 | 15 | 30 | 150 |
| Example | 2 | 350 | 9 | 15 | 30 | 100 |
| Comparative Example | 2 | 340 | 8 | 15 | 30 | 20 |
| Example | 3 | 360 | 13 | 20 | 30 | 250 |
| Example | 4 | 370 | 10 | 15 | 30 | 20 |
| Comparative Example | 3 | 380 | 15 | 15 | 30 | 150 |
| Comparative Example | 4 | 400 | 15 | 10 | 30 | 100 |
| Comparative Example | 5 | 390 | 10 | 10 | 30 | 150 |
| Comparative Example | 6 | 350 | 12 | 15 | 30 | 50 |
| Comparative Example | 7 | 360 | 13 | 20 | 30 | 200 |
| Example | 5 | 370 | 21 | 15 | 30 | 100 |
| Example | 6 | 380 | 17 | 20 | 30 | 2000 |
| Example | 7 | 350 | 10 | 15 | 30 | 2000 |
| Comparative Example | 8 | 350 | 10 | 5 | 30 | 150 |

TABLE 10

| | | Production conditions | | | | | |
|---|---|---|---|---|---|---|---|
| | | Plating step | | | | First cooling step | |
| | | | | | | Achieving | |
| Classification | No. | Plating bath temperature ° C. | Plating thickness μm | Plating atmosphere | Immersion time of steel sheet sec | temperature of first cooling step ° C. | Cooling rate of first cooling step ° C./sec |
|---|---|---|---|---|---|---|---|
| Example | 8 | 450 | 15 | under normal atmosphere | 1 | 300 | 7 |
| Example | 9 | 460 | 15 | under normal atmosphere | 5 | 290 | 8 |
| Example | 10 | 430 | 12 | under normal atmosphere | 3 | 280 | 5 |
| Example | 11 | 460 | 16 | under normal atmosphere | 5 | 40 | 8 |
| Example | 12 | 460 | 15 | under normal atmosphere | 3 | 310 | 5 |
| Example | 13 | 450 | 13 | under normal atmosphere | 5 | 280 | 6 |
| Example | 14 | 480 | 15 | under normal atmosphere | 7 | 290 | 10 |
| Example | 15 | 450 | 17 | under normal atmosphere | 5 | 300 | 8 |
| Example | 16 | 450 | 15 | under normal atmosphere | 3 | 240 | 9 |
| Example | 17 | 450 | 22 | under normal atmosphere | 5 | 240 | 10 |
| Example | 18 | 470 | 10 | under normal atmosphere | 1 | 260 | 10 |
| Comparative Example | 9 | 480 | 8 | under normal atmosphere | 3 | 280 | 7 |
| Example | 19 | 460 | 10 | under normal atmosphere | 5 | 280 | 8 |
| Example | 20 | 460 | 6 | under normal atmosphere | 1 | 260 | 8 |
| Example | 21 | 450 | 10 | under normal atmosphere | 3 | 290 | 7 |

| | | | Production conditions | | | | |
|---|---|---|---|---|---|---|---|
| | | | Temperature increasing step | | | Second cooling step | |
| | | | | | Temperature | | |
| Classification | No. | Heating temperature ° C. | Holding time sec | increasing rate up to heating temperature ° C./sec | Temperature of cooling completion ° C. | Cooling rate ° C./sec |
|---|---|---|---|---|---|---|
| Example | 8 | 360 | 20 | 30 | 30 | 200 |
| Example | 9 | 370 | 15 | 15 | 30 | 250 |
| Example | 10 | 380 | 11 | 20 | 30 | 100 |
| Example | 11 | 400 | 15 | 25 | 30 | 100 |
| Example | 12 | 360 | 13 | 20 | 30 | 150 |
| Example | 13 | 380 | 15 | 30 | 30 | 100 |
| Example | 14 | 370 | 12 | 35 | 30 | 150 |
| Example | 15 | 380 | 14 | 45 | 30 | 2000 |
| Example | 16 | 350 | 13 | 40 | 30 | 2000 |

TABLE 10-continued

| | | | | | | |
|---|---|---|---|---|---|---|
| Example | 17 | 360 | 6 | 10 | 30 | 2000 |
| Example | 18 | 370 | 12 | 15 | 30 | 150 |
| Comparative Example | 9 | 410 | 10 | 20 | 30 | 100 |
| Example | 19 | 400 | 12 | 20 | 30 | 250 |
| Example | 20 | 350 | 13 | 20 | 30 | 200 |
| Example | 21 | 360 | 19 | 20 | 30 | 150 |

TABLE 11

| | | Production conditions | | | | |
|---|---|---|---|---|---|---|
| | | Plating step | | | | First cooling step |
| | | | | | | Achieving |
| Classification | No. | Plating bath temperature ° C. | Plating thickness μm | Plating atmosphere | Immersion time of steel sheet sec | temperature of first cooling step ° C. | Cooling rate of first cooling step ° C./sec |

| Classification | No. | Plating bath temperature ° C. | Plating thickness μm | Plating atmosphere | Immersion time of steel sheet sec | Achieving temperature of first cooling step ° C. | Cooling rate of first cooling step ° C./sec |
|---|---|---|---|---|---|---|---|
| Comparative Example | 10 | 460 | 10 | under normal atmosphere | 5 | 260 | 7 |
| Example | 22 | 470 | 9 | under normal atmosphere | 1 | 260 | 6 |
| Example | 23 | 480 | 10 | under normal atmosphere | 5 | 280 | 10 |
| Example | 24 | 480 | 10 | under normal atmosphere | 7 | 300 | 5 |
| Comparative Example | 11 | 490 | 10 | under normal atmosphere | 1 | 300 | 5 |
| Example | 25 | 480 | 15 | under normal atmosphere | 5 | 190 | 10 |
| Example | 26 | 480 | 15 | under normal atmosphere | 3 | 280 | 8 |
| Example | 27 | 470 | 16 | under normal atmosphere | 3 | 290 | 10 |
| Example | 28 | 490 | 12 | under normal atmosphere | 3 | 280 | 8 |
| Example | 29 | 480 | 13 | under normal atmosphere | 3 | 260 | 10 |
| Example | 30 | 510 | 20 | under normal atmosphere | 3 | 250 | 8 |
| Comparative Example | 12 | 490 | 15 | under normal atmosphere | 3 | 280 | 12 |
| Example | 31 | 490 | 16 | under normal atmosphere | 3 | 250 | 5 |
| Example | 32 | 490 | 15 | under normal atmosphere | 3 | 260 | 6 |
| Example | 33 | 510 | 10 | under normal atmosphere | 5 | 280 | 10 |

| | | Production conditions | | | |
|---|---|---|---|---|---|
| | | Temperature increasing step | | | Second cooling step |
| Classification | No. | Heating temperature ° C. | Holding time sec | Temperature increasing rate up to heating temperature ° C./sec | Temperature of cooling completion ° C. | Cooling rate ° C./sec |

| Classification | No. | Heating temperature ° C. | Holding time sec | Temperature increasing rate up to heating temperature ° C./sec | Temperature of cooling completion ° C. | Cooling rate ° C./sec |
|---|---|---|---|---|---|---|
| Comparative Example | 10 | 360 | 18 | 20 | 30 | 15 |
| Example | 22 | 370 | 17 | 20 | 30 | 150 |
| Example | 23 | 380 | 15 | 10 | 30 | 200 |
| Example | 24 | 360 | 13 | 15 | 30 | 100 |
| Comparative Example | 11 | 400 | 32 | 20 | 30 | 2000 |
| Example | 25 | 370 | 15 | 20 | 30 | 2000 |
| Example | 26 | 380 | 10 | 15 | 30 | 2000 |
| Example | 27 | 360 | 15 | 10 | 30 | 200 |
| Example | 28 | 360 | 15 | 15 | 30 | 2000 |
| Example | 29 | 360 | 10 | 20 | 30 | 2000 |
| Example | 30 | 370 | 30 | 15 | 30 | 150 |
| Comparative Example | 12 | 370 | 15 | 10 | 30 | 150 |
| Example | 31 | 380 | 10 | 10 | 30 | 2000 |
| Example | 32 | 360 | 12 | 15 | 30 | 2000 |
| Example | 33 | 360 | 12 | 10 | 30 | 2000 |

TABLE 12

| | | Production conditions | | | | First cooling step | |
|---|---|---|---|---|---|---|---|
| | | Plating step | | | | Achieving | |
| Classification | No. | Plating bath temperature °C. | Plating thickness μm | Plating atmosphere | Immersion time of steel sheet sec | temperature of first cooling step °C. | Cooling rate of first cooling step °C./sec |
| Example | 34 | 530 | 14 | under normal atmosphere | 3 | 310 | 8 |
| Example | 35 | 540 | 15 | under normal atmosphere | 1 | 320 | 7 |
| Comparative Example | 13 | 530 | 10 | under normal atmosphere | 3 | 340 | 10 |
| Example | 36 | 530 | 15 | under normal atmosphere | 5 | 290 | 8 |
| Example | 37 | 530 | 20 | under normal atmosphere | 3 | 280 | 8 |
| Comparative Example | 14 | 540 | 20 | under normal atmosphere | 5 | 260 | 8 |
| Example | 38 | 530 | 20 | under normal atmosphere | 5 | 250 | 10 |
| Example | 39 | 540 | 18 | under normal atmosphere | 3 | 260 | 7 |
| Comparative Example | 15 | 540 | 15 | under normal atmosphere | 5 | 210 | 7 |
| Comparative Example | 16 | 350 | 16 | under normal atmosphere | 3 | 30 | 2000 |
| Comparative Example | 17 | 450 | 13 | under normal atmosphere | 3 | 30 | 2000 |
| Comparative Example | 18 | 490 | 15 | under normal atmosphere | 3 | 30 | 2000 |
| Comparative Example | 19 | 530 | 16 | under normal atmosphere | 3 | 30 | 2000 |
| Comparative Example | 20 | 540 | 15 | under normal atmosphere | 3 | 30 | 2000 |
| Comparative Example | 21 | 400 | 8 | under normal atmosphere | 3 | 30 | 10 |
| Comparative Example | 22 | — | 8 | — | — | — | — |

| | | Production conditions | | | | |
|---|---|---|---|---|---|---|
| | | Temperature increasing step | | | Second cooling step | |
| | | | | Temperature increasing rate up to heating temperature °C./sec | Temperature of cooling completion °C. | Cooling rate °C./sec |
| Classification | No. | Heating temperature °C. | Holding time sec | | | |
| Example | 34 | 360 | 15 | 15 | 30 | 2000 |
| Example | 35 | 350 | 18 | 20 | 30 | 150 |
| Comparative Example | 13 | 380 | 11 | 10 | 30 | 100 |
| Example | 36 | 350 | 19 | 15 | 30 | 200 |
| Example | 37 | 370 | 18 | 20 | 30 | 2000 |
| Comparative Example | 14 | 360 | 13 | 15 | 30 | 2000 |
| Example | 38 | 380 | 15 | 20 | 30 | 2000 |
| Example | 39 | 350 | 15 | 15 | 30 | 2000 |
| Comparative Example | 15 | 350 | 16 | 20 | 30 | 2000 |
| Comparative Example | 16 | — | — | — | — | — |
| Comparative Example | 17 | — | — | — | — | — |
| Comparative Example | 18 | — | — | — | — | — |
| Comparative Example | 19 | — | — | — | — | — |
| Comparative Example | 20 | — | — | — | — | — |
| Comparative Example | 21 | — | — | — | — | — |
| Comparative Example | 22 | — | — | — | — | — |

Incidentally, in order to confirm the structure of the plating layer, CP processing was performed in the cross-sectional direction of the obtained plated steel sheet and then FE-SEM observation was performed. As evaluation criteria, a case where the multi-layered structure composed of the compound layer 2 and the fine layer 1 formed on the compound layer 2 was observed as the plating layer in the obtained FE-SEM image was designated as "+" and a case where the plating layer composed of only the fine layer 1 or composed of other structures was observed was designated as "-." In a case where the multi-layered structure can be confirmed, the thickness ratio of the fine layer (second plating layer) 1 to the entire plating layer was measured.

Regarding cracks of the plating layer, the plating layer surface was subjected to SEM observation and five of arbitrary fields of view of 1 cm square were selected. One field of view was divided into 100 lattice regions of 1 mm$^2$, and each region was observed. A case where cracks were observed in 50% or more of regions in terms of average value was designated as "+" and a case where cracks were not observed was designated as "-."

Furthermore, regarding a case where a multi-layered structure can be confirmed in the observation of the cross section of the plating layer obtained from the electron beam diffraction image of a TEM, the plating structures of the compound layer 2 serving as the first plating layer and the fine layer 1 serving as the second plating layer were confirmed. Herein, the observed plating structures among MgZn, Mg, and the quasicrystal in the compound layer 2 were provided with the symbol "+". Similarly, the observed plating structures among $Mg_{51}Zn_{20}$, Zn, and the quasicrystal in the fine layer 1 were provided with the symbol "+". Further, a case where the interface alloy layer formed from the Al—Fe intermetallic compound was observed was designated as "+" and then the thickness of the interface alloy layer was measured, and a case where the interface alloy layer was not observed was designated as "-."

Further, regarding a case where the multi-layered structure can be confirmed in the observation of the cross section of the plating layer obtained from an electron beam diffraction image of a TEM, the area ratio of the structure, which is composed of the MgZn phase, the Zn phase, and the quasicrystal phase, in the compound layer 2 and the area ratio of the structure, which is composed of the $Mg_{51}Zn_{20}$ phase, the Zn phase, and the quasicrystal phase, in the fine layer 1 were measured. Incidentally, the measurement of the area ratio in each layer was performed by an image process by a computer.

Further, evaluation of bare corrosion resistance of the plated steel sheet (flat sheet corrosion resistance) was performed on the obtained plated steel sheet in a cycle corrosion acceleration test according to M609-91 of Japanese Automotive Standards Organization (JASO) while only the salt water concentration was set to 0.5% NaCl. Specifically, a case where the corrosion weight loss after 60 cycles was more than 30 g/m$^2$ was designated as "Poor," a case where the corrosion weight loss after 60 cycles was 30 to 10 g/m$^2$ was designated as "Good," and a case where the corrosion weight loss after 60 cycles was less than 10 g/m$^2$ was designated as "Excellent." The removal of the corrosion product of the plating layer was performed by a method of "using 200 g/l of chromium (VI) oxide and immersing for 1 minute at normal temperature."

A salt water spray test defined in JIS Z2371 was performed in order to confirm the effect of suppressing red rust of the plating layer. A case where generation of red rust was not observed over the plating thickness (µm)×150 hours was designated as "Good" and a case where generation of red rust was observed was designated as "Poor." In particular, a case where generation of red rust was not observed over the plating thickness (µm)×200 hours was designated as "Excellent."

The plating adhesion was evaluated by a ball impact test. In the ball impact test, while an impact core having a hemispherical convex surface was disposed at the rear side of a test surface and a tray having a hemispherical concave shape was disposed at the test surface side, a steel weight having a diameter of ½ inch (weight: 2 kg) was dropped from a height of 70 cm to hit the impact core. An adhesive cellophane tape manufactured by Nichiban Co., Ltd. was attached to the test surface protruded by the impact core and then torn off and then peeling from the surface of the plated steel sheet was observed. A case where peeling was not observed was designated as "Excellent," a case where peeling of the plating layer (less than 1% in terms of area %) at the edge portion or the convex portion was slightly observed was designated as "Good," a case where 1% or more of peeling was observed was designated as "Poor."

Generation of white rust was evaluated by a salt water spray test (SST: Salt Spray Test) according to JIS Z2371: 2000. Specifically, the salt water spray test (SST) was performed with a 5% NaCl aqueous solution by using the produced plated steel sheet, and the elapsed time of the test when white rust is generated on the planar surface portion of the plated steel sheet at more than 5% in terms of area % was investigated. Regarding the white rust generation evaluation, the plated steel sheet in which white rust was not confirmed after 120 hours was designated as "Excellent," the plated steel sheet in which white rust was not confirmed after 24 hours was designated as "Good," and the plated steel sheet in which white rust was confirmed at shorter than 24 hours was designated as "Poor." Incidentally, "Excellent" indicates the most excellent result in the white rust generation evaluation.

Further, the obtained plated steel sheet was subjected to a Zn phosphate treatment and coated with an electrodeposition coating material (manufactured by Nippon Paint Co., Ltd., POWERTOP U-30), an intermediate coating material (manufactured by Nippon Paint Co., Ltd., ORGA P-2) was applied in a wet-on-wet manner onto the coated sheet, and then the resultant product was baked at 140° C. for 30 minutes. As a top coating material, a metallic coating material (manufactured by Nippon Paint Co., Ltd., product name "Superlac M-155 Silver") was applied to have a dried film thickness of about 15 µm, and then a clear coating material (manufactured by Nippon Paint Co., Ltd., product name "Superlac O-150 Clear") was applied in a wet-on-wet manner to have a dried film thickness of about 40 µm. After setting for about 7 minutes, baking was performed at 140° C. for 25 minutes to thereby obtain a laminate coating film. A solvent-type metallic base coating material "Superlac M-90" manufactured by Nippon Paint Co., Ltd. was applied to this laminate coating film, a clear coating material was applied thereto in a wet-on-wet manner, and then baking was performed at 140° C. for 30 minutes.

Next, evaluation of chipping resistance was performed on the plated steel sheet provided with the coating film subjected to the aforementioned series of coating. Specifically, 100 g of No. 7 crushed stone was crashed on the coating film cooled to −20° C. at an angle of 90 degrees from a distance of 30 cm under an air pressure of 3.0 kg/cm$^2$ by using a gravelometer (manufactured by Suga Test Instruments Co., Ltd.), the degree of peeling was visually observed, and then evaluation was performed on the basis of the following determination criteria. Incidentally, in these Examples, "3" was designated as "Good" as a temporary evaluation, "4" or higher was designated as "Excellent," and "2" or lower was designated as "Poor."

5: No peeling was caused.
4: Peeled-off area is small and the frequency is low.
3: Peeled-off area is small but the frequency is slightly high.
2: Peeled-off area is large but the frequency is low.
1: Peeled-off area is large and the frequency is high.

Further, after the gravel test, the salt water spray test defined in JIS Z2371 was performed. A case where only white rust was confirmed after 720 hours was designated as "Excellent," a case where the red rust generation area ratio with respect to white rust was 0 to 10% or less in frequency was designated as "Very Good," a case where the red rust generation area ratio with respect to white rust was 10 to 20% or less in frequency was designated as "Good," and a case where the red rust generation area ratio with respect to white rust was more than 20% in frequency was designated as "Poor."

The anti-glare effect was evaluated by a spectrophotometric colorimetry. In a normal situation, the evaluation is preferably performed by visual inspection. However, after a correlation between visual inspection and L* values obtained by a colorimeter was confirmed in advance, the evaluation was performed by an SCI (specular composition included) scheme using a spectrocolorimeter (light source: D65, field of view: 10°). Specifically, the L* value of the produced plated steel sheet was investigated using a spectrocolorimeter CM2500d manufactured by KONICA MINOLTA, INC. under conditions including a measurement diameter of 8ϕ, a field of view of 10°, and a light source of D65.

Regarding the anti-glare effect, the plated steel sheet in which the L* value was less than 75 was designated as "Excellent" and the plated steel sheet in which the L* value was not less than 75 was designated as "Poor." Incidentally, "Excellent" indicates the result excellent in the anti-glare effect.

For an index regarding evaluation of scratch resistance, the hardness (Vickers hardness) of the plating layer was measured. A sample was cut into 50×50 mm, and the Hv value as an average of 30 items was measured at an interval of 2 mm in the horizontal direction and an interval of 7.5 mm in the vertical direction under a load 10 gf by using AAV-504 manufactured by Mitutoyo Corporation according to Marine Survey No. H-05TK225. A case where the average Hv value was 250 or more was designated as "Excellent," a case where the average Hv value was 200 or more was designated as "Good," and a case where the average Hv value was less than 200 was designated as "Poor." Incidentally, 1 gf is about $9.8 \times 10^{-3}$ N.

The appearance of the plated steel sheet was evaluated by a storing test in a thermostat-humidistat box. Specifically, the produced plated steel sheet was held in the thermostat-humidistat bath (temperature: 40° C., humidity: 95%) for 120 hours, and then the area % of the blackened portion on the planar surface portion of the plated steel sheet after holding was investigated.

Regarding the appearance evaluation, the plated steel sheet in which the blackened portion was less than 1% with respect to the evaluation area (45 mm×70 mm) in area % was designated as "Excellent," the plated steel sheet in which the blackened portion was 1% to less than 3% was designated as "Good," and the plated steel sheet in which the blackened portion was 3% or more was designated as "Poor." Incidentally, "Excellent" indicates the most excellent result in the appearance evaluation.

Incidentally, as comparative materials, Zn-22% Al-7% Mg-0.2% Si and a commercially available hot-dip Zn-plated steel sheet were similarly evaluated as the Zn-based plated steel sheet.

The above evaluation results are presented in the following Tables 13 and 20.

TABLE 13

| | | | | | | | | | | | | | | | |
|---|---|---|---|---|---|---|---|---|---|---|---|---|---|---|---|
| | | | | Metallic structure of plating layer | | | | | | | | | | | |
| | | | | First plating layer (compound layer) | | | | | Second plating layer (fine layer) | | | | | Alloy layer (interface alloy layer) | |
| | | Composite phase | Crack | | MgZn Grain | | | | | | | | Maximum grain | | |
| Classification | No. | determination | determination | MgZn % | Existence | size µm | Mg | Quasicrystal phase | $Mg_{51}Zn_{20}$ % | $Mg_{51}Zn_{20}$ | Zn | Mg | size µm | Existence | nm |
| Comparative Example | 1 | − | − | — | − | 0.3 | − | − | 80 | + | − | + | 5 | + | 150 |
| Example | 1 | + | − | 10 | + | 3 | + | + | 100 | + | + | − | 1.3 | + | 170 |
| Example | 2 | + | − | 10 | + | 0.8 | + | + | 100 | + | + | − | 1.1 | + | 200 |
| Comparative Example | 2 | − | + | 5 | + | 0.4 | + | + | 75 | + | + | + | 3.5 | + | 200 |
| Example | 3 | + | − | 15 | + | 5 | + | + | 100 | + | + | − | 1.5 | + | 150 |
| Example | 4 | + | − | 15 | + | 5 | + | + | 100 | + | + | + | 1.3 | + | 100 |
| Comparative Example | 3 | − | − | — | − | — | − | − | 40 | + | − | + | 8 | + | 30 |
| Comparative Example | 4 | − | − | — | − | — | − | − | 35 | + | − | + | 7 | + | 100 |
| Comparative Example | 5 | − | − | — | − | — | − | − | 50 | + | − | + | 6 | + | 150 |
| Comparative Example | 6 | − | − | — | − | — | − | − | 40 | + | − | + | 6 | + | 180 |
| Comparative Example | 7 | − | − | — | − | — | − | − | 30 | + | − | + | 8 | + | 1000 |
| Example | 5 | + | − | 15 | + | 8 | + | + | 100 | + | + | − | 1.3 | + | 200 |
| Example | 6 | + | − | 35 | + | 5 | + | + | 100 | + | + | − | 0.8 | + | 180 |
| Example | 7 | + | − | 40 | + | 5 | + | + | 100 | + | + | − | 1 | + | 150 |
| Comparative Example | 8 | − | + | 75 | + | 8 | + | + | 40 | + | + | + | 5 | + | 180 |

TABLE 14

| | | Metallic structure of plating layer | | | | | | | | | | | | |
|---|---|---|---|---|---|---|---|---|---|---|---|---|---|---|
| | | First plating layer (compound layer) | | | | | | Second plating layer (fine layer) | | | | | Alloy layer (interface alloy layer) | |
| | | Composite phase | | | MgZn | | | | | | | | | |
| Classification | No. | determination | Crack determination | MgZn % | Existence | Grain size μm | Mg | Quasicrystal phase | $Mg_{51}Zn_{20}$ % | $Mg_{51}Zn_{20}$ | Zn | Mg | Maximum grain size μm | Existence | nm |
| Example | 8 | + | − | 45 | + | 3 | + | + | 100 | + | + | − | 1.6 | + | 200 |
| Example | 9 | + | − | 25 | + | 4 | + | + | 100 | + | + | − | 1.1 | + | 200 |
| Example | 10 | + | − | 30 | + | 4 | + | + | 100 | + | + | − | 0.7 | + | 100 |
| Example | 11 | + | − | 15 | + | 5 | + | + | 75 | + | + | + | 1.3 | + | 120 |
| Example | 12 | + | − | 45 | + | 4 | + | + | 100 | + | + | − | 1.3 | + | 120 |
| Example | 13 | + | − | 20 | + | 5 | + | + | 100 | + | + | − | 0.9 | + | 200 |
| Example | 14 | + | − | 45 | + | 5 | + | + | 100 | + | + | − | 1.1 | + | 180 |
| Example | 15 | + | − | 45 | + | 4 | + | + | 100 | + | + | − | 1.4 | + | 150 |
| Example | 16 | + | − | 50 | + | 5 | + | + | 100 | + | + | − | 1.1 | + | 170 |
| Example | 17 | + | − | 5 | + | 4 | + | + | 100 | + | + | − | 1 | + | 150 |
| Example | 18 | + | − | 45 | + | 3 | + | + | 100 | + | + | − | 1.3 | + | 150 |
| Comparative Example | 9 | − | + | — | − | — | + | + | | + | + | + | 4 | + | 200 |
| Example | 19 | + | − | 40 | + | 2 | + | + | 100 | + | + | − | 0.7 | + | 180 |
| Example | 20 | + | − | 15 | + | 1.5 | + | + | 100 | + | + | − | 1.2 | + | 50 |
| Example | 21 | + | − | 25 | + | 2 | + | + | 100 | + | + | − | 1.2 | + | 180 |

TABLE 15

| | | Metallic structure of plating layer | | | | | | | | | | | | |
|---|---|---|---|---|---|---|---|---|---|---|---|---|---|---|
| | | First plating layer (compound layer) | | | | | | Second plating layer (fine layer) | | | | | Alloy layer (interface alloy layer) | |
| | | Composite phase | | | MgZn | | | | | | | | | |
| Classification | No. | determination | Crack determination | MgZn % | Existence | Grain size μm | Mg | Quasicrystal phase | $Mg_{51}Zn_{20}$ % | $Mg_{51}Zn_{20}$ | Zn | Mg | Maximum grain size μm | Existence | nm |
| Comparative Example | 10 | − | − | — | − | — | − | − | 5 | − | + | + | 6 | + | 150 |
| Example | 22 | + | − | 15 | + | 3 | + | + | 100 | + | + | − | 1.2 | + | 180 |
| Example | 23 | + | − | 45 | + | 3 | + | + | 100 | + | + | − | 1.1 | + | 170 |
| Example | 24 | + | − | 35 | + | 4 | + | + | 100 | + | + | − | 1 | + | 200 |
| Comparative Example | 11 | − | + | — | − | — | + | + | 80 | + | + | + | 4 | + | 180 |
| Example | 25 | + | − | 45 | + | 4 | + | + | 90 | + | + | + | 1.6 | + | 170 |
| Example | 26 | + | − | 60 | + | 4 | + | + | 100 | + | + | − | 0.9 | + | 20 |
| Example | 27 | + | − | 40 | + | 5 | + | + | 100 | + | + | − | 0.7 | + | 140 |
| Example | 28 | + | − | 50 | + | 4 | + | + | 100 | + | + | − | 1.1 | + | 190 |
| Example | 29 | + | − | 50 | + | 4 | + | + | 100 | + | + | − | 1.3 | + | 20 |
| Example | 30 | + | − | 50 | + | 6 | + | + | 100 | + | + | − | 1.3 | + | 190 |
| Comparative Example | 12 | − | + | — | − | — | + | + | 75 | + | + | + | 3 | + | 150 |
| Example | 31 | + | − | 15 | + | 4 | + | + | 90 | + | + | − | 1.5 | + | 190 |
| Example | 32 | + | − | 15 | + | 4 | + | + | 90 | + | + | − | 1.3 | + | 190 |
| Example | 33 | + | − | 10 | + | 3 | + | + | 90 | + | + | − | 1.2 | + | 30 |

TABLE 16

| | | | | First plating layer (compound layer) | | | | | Second plating layer (fine layer) | | | | | Alloy layer (interface alloy layer) | |
|---|---|---|---|---|---|---|---|---|---|---|---|---|---|---|---|
| | | Composite phase determination | Crack determination | MgZn % | MgZn Existence | Grain size μm | Mg | Quasicrystal phase | $Mg_{51}Zn_{20}$ % | $Mg_{51}Zn_{20}$ | Zn | Mg | Maximum grain size μm | Existence | nm |
| Classification | No. | | | | | | | | | | | | | | |
| Example | 34 | + | − | 50 | + | 4 | + | + | 90 | + | + | − | 1.1 | + | 150 |
| Example | 35 | + | − | 45 | + | 5 | + | + | 90 | + | + | − | 1.3 | + | 150 |
| Comparative Example | 13 | − | + | — | − | — | − | − | 80 | + | + | + | 4 | + | 10 |
| Example | 36 | + | − | 45 | + | 5 | + | + | 90 | + | + | − | 1.2 | + | 130 |
| Example | 37 | + | − | 45 | + | 5 | + | + | 90 | + | + | − | 1.2 | + | 5 |
| Comparative Example | 14 | − | − | — | − | — | − | − | 10 | + | + | + | 1.3 | + | 130 |
| Example | 38 | + | − | 15 | + | 5 | + | + | 90 | + | + | − | 1.1 | + | 180 |
| Example | 39 | + | − | 15 | + | 4 | + | + | 90 | + | + | − | 1.3 | + | 150 |
| Comparative Example | 15 | − | − | — | − | — | − | − | 10 | + | + | + | 2 | + | 150 |
| Comparative Example | 16 | − | + | — | − | — | − | − | 95 | + | + | − | 5 | + | 180 |
| Comparative Example | 17 | − | + | — | − | — | − | − | 80 | + | + | − | 7 | + | 170 |
| Comparative Example | 18 | − | + | — | − | — | − | − | 70 | + | + | − | 5 | + | 150 |
| Comparative Example | 19 | − | + | — | − | — | − | − | 60 | + | + | − | 8 | + | 160 |
| Comparative Example | 20 | − | + | — | − | — | − | − | 45 | + | + | − | 6 | + | 150 |
| Comparative Example | 21 | − | − | — | − | — | − | − | — | − | + | − | — | − | 0 |
| Comparative Example | 22 | | | | | | | | | | | | | − | 0 |

TABLE 17

| | | Corrosion resistance evaluation | | | | | | Corrosion resistance after gravel test | | |
|---|---|---|---|---|---|---|---|---|---|---|
| Classification | No. | Planar surface corrosion resistance | SST | Ball impact | White rust generation evaluation | Anti-glare effect | Gravel test | | Vickers hardness | Appearance evaluation |
| Comparative Example | 1 | Poor | Poor | Excellent | Poor | Good | Poor | Poor | Good | Poor |
| Example | 1 | Good | Excellent | Excellent | Poor | Excellent | Excellent | Very Good | Excellent | Excellent |
| Example | 2 | Good | Excellent | Excellent | Excellent | Excellent | Excellent | Very Good | Excellent | Excellent |
| Comparative Example | 2 | Poor | Poor | Good | Poor | Good | Poor | Poor | Good | Poor |
| Example | 3 | Good | Excellent | Excellent | Good | Excellent | Excellent | Very Good | Excellent | Excellent |
| Example | 4 | Good | Good | Good | Excellent | Good | Excellent | Very Good | Excellent | Good |
| Comparative Example | 3 | Poor | Poor | Poor | Poor | Excellent | Poor | Poor | Poor | Poor |
| Comparative Example | 4 | Poor | Poor | Poor | Poor | Excellent | Poor | Poor | Poor | Poor |
| Comparative Example | 5 | Poor | Poor | Poor | Poor | Good | Poor | Poor | Poor | Poor |
| Comparative Example | 6 | Poor | Poor | Poor | Poor | Good | Poor | Poor | Poor | Poor |
| Comparative Example | 7 | Poor | Poor | Good | Poor | Good | Poor | Poor | Poor | Poor |
| Example | 5 | Good | Good | Good | Good | Good | Excellent | Good | Excellent | Excellent |
| Example | 6 | Excellent | Good | Excellent | Good | Excellent | Excellent | Excellent | Excellent | Excellent |
| Example | 7 | Excellent | Excellent | Excellent | Good | Good | Excellent | Excellent | Excellent | Excellent |
| Comparative Example | 8 | Poor | Poor | Good | Poor | Good | Poor | Poor | Good | Poor |

TABLE 18

| Classification | No. | Corrosion resistance evaluation | | | | | | Corrosion resistance after gravel test | Vickers hardness | Appearance evaluation |
|---|---|---|---|---|---|---|---|---|---|---|
| | | Planar surface corrosion resistance | SST | Ball impact | White rust generation evaluation | Anti-glare effect | Gravel test | | | |
| Example | 8 | Good | Good | Good | Excellent | Good | Excellent | Very Good | Excellent | Excellent |
| Example | 9 | Excellent | Excellent | Excellent | Good | Excellent | Excellent | Excellent | Excellent | Excellent |
| Example | 10 | Excellent | Excellent | Excellent | Good | Good | Excellent | Excellent | Excellent | Excellent |
| Example | 11 | Good | Good | Good | Good | Good | Good | Good | Good | Good |
| Example | 12 | Good | Good | Good | Good | Good | Excellent | Very Good | Excellent | Excellent |
| Example | 13 | Excellent | Excellent | Excellent | Good | Good | Excellent | Excellent | Excellent | Excellent |
| Example | 14 | Good | Good | Good | Excellent | Good | Excellent | Very Good | Excellent | Excellent |
| Example | 15 | Good | Excellent | Good | Good | Good | Excellent | Very Good | Excellent | Excellent |
| Example | 16 | Good | Excellent | Excellent | Good | Good | Excellent | Very Good | Excellent | Excellent |
| Example | 17 | Good | Excellent | Excellent | Good | Excellent | Excellent | Good | Excellent | Excellent |
| Example | 18 | Good | Excellent | Good | Good | Good | Excellent | Very Good | Excellent | Excellent |
| Comparative Example | 9 | Poor | Poor | Good | Poor | Good | Poor | Poor | Good | Poor |
| Example | 19 | Excellent | Excellent | Good | Good | Excellent | Excellent | Excellent | Excellent | Excellent |
| Example | 20 | Good | Good | Excellent | Excellent | Good | Excellent | Very Good | Excellent | Excellent |
| Example | 21 | Good | Excellent | Good | Good | Good | Excellent | Very Good | Excellent | Excellent |

TABLE 19

| Classification | No. | Corrosion resistance evaluation | | | | | | Corrosion resistance after gravel test | Vickers hardness | Appearance evaluation |
|---|---|---|---|---|---|---|---|---|---|---|
| | | Planar surface corrosion resistance | SST | Ball impact | White rust generation evaluation | Anti-glare effect | Gravel test | | | |
| Comparative Example | 10 | Poor | Poor | Good | Poor | Good | Excellent | Good | Good | Poor |
| Example | 22 | Good | Excellent | Good | Good | Good | Excellent | Very Good | Excellent | Excellent |
| Example | 23 | Good | Excellent | Good | Good | Good | Excellent | Very Good | Excellent | Excellent |
| Example | 24 | Excellent | Good | Good | Good | Excellent | Excellent | Excellent | Excellent | Excellent |
| Comparative Example | 11 | Poor | Poor | Good | Poor | Good | Poor | Poor | Good | Poor |
| Example | 25 | Good | Excellent | Good | Good | Good | Excellent | Good | Good | Good |
| Example | 26 | Good | Excellent | Good | Good | Good | Excellent | Very Good | Excellent | Excellent |
| Example | 27 | Excellent | Excellent | Good | Good | Excellent | Excellent | Excellent | Excellent | Excellent |
| Example | 28 | Good | Good | Excellent | Good | Good | Excellent | Very Good | Excellent | Excellent |
| Example | 29 | Good | Excellent | Good | Good | Good | Excellent | Very Good | Excellent | Excellent |
| Example | 30 | Good | Good | Good | Good | Good | Excellent | Good | Excellent | Excellent |
| Comparative Example | 12 | Poor | Poor | Good | Poor | Good | Poor | Poor | Good | Poor |
| Example | 31 | Good | Good | Excellent | Excellent | Good | Excellent | Very Good | Good | Excellent |
| Example | 32 | Good | Excellent | Excellent | Good | Good | Excellent | Very Good | Good | Excellent |
| Example | 33 | Good | Good | Good | Good | Good | Excellent | Very Good | Good | Excellent |

TABLE 20

| Classification | No. | Corrosion resistance evaluation | | | | | | Corrosion resistance after gravel test | Vickers hardness | Appearance evaluation |
|---|---|---|---|---|---|---|---|---|---|---|
| | | Planar surface corrosion resistance | SST | Ball impact | White rust generation evaluation | Anti-glare effect | Gravel test | | | |
| Example | 34 | Good | Excellent | Good | Excellent | Good | Excellent | Very Good | Good | Excellent |
| Example | 35 | Good | Excellent | Good | Excellent | Good | Excellent | Very Good | Good | Excellent |
| Comparative Example | 13 | Poor | Poor | Good | Poor | Good | Poor | Poor | Good | Poor |
| Example | 36 | Good | Excellent | Excellent | Good | Good | Excellent | Very Good | Good | Excellent |
| Example | 37 | Good | Excellent | Excellent | Good | Excellent | Excellent | Very Good | Good | Excellent |
| Comparative Example | 14 | Poor | Poor | Good | Poor | Excellent | Poor | Poor | Poor | Poor |
| Example | 38 | Good | Good | Excellent | Good | Good | Good | Very Good | Good | Excellent |
| Example | 39 | Good | Good | Good | Excellent | Good | Good | Very Good | Good | Excellent |
| Comparative Example | 15 | Poor | Poor | Excellent | Poor | Good | Poor | Poor | Poor | Poor |

TABLE 20-continued

| Classification | No. | Corrosion resistance evaluation | | | | Anti-glare effect | Gravel test | Corrosion resistance after gravel test | Vickers hardness | Appearance evaluation |
| --- | --- | --- | --- | --- | --- | --- | --- | --- | --- | --- |
| | | Planar surface corrosion resistance | SST | Ball impact | White rust generation evaluation | | | | | |
| Comparative Example | 16 | Poor | Poor | Good | Poor | Good | Poor | Poor | Good | Poor |
| Comparative Example | 17 | Poor | Poor | Good | Poor | Good | Poor | Poor | Good | Poor |
| Comparative Example | 18 | Poor | Poor | Good | Poor | Good | Poor | Poor | Good | Poor |
| Comparative Example | 19 | Poor | Poor | Good | Poor | Good | Poor | Poor | Poor | Poor |
| Comparative Example | 20 | Poor | Poor | Good | Poor | Good | Poor | Poor | Poor | Poor |
| Comparative Example | 21 | Poor | Poor | Excellent | Poor | Excellent | Excellent | Poor | Poor | Excellent |
| Comparative Example | 22 | Poor | Poor | Excellent | Poor | Excellent | Excellent | Poor | Poor | Excellent |

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 second plating layer (fine layer)
2 first plating layer (compound layer)
3 alloy layer (interface alloy layer)
4 crack (chipping crack)

The invention claimed is:

1. A quasicrystal-containing plated steel sheet comprising:
a plating layer positioned on at least one surface of a steel sheet; and
an alloy layer positioned at an interface between the plating layer and the steel sheet and composed of an Al—Fe intermetallic compound,
wherein a chemical composition of the plating layer contains, in atom %,
Zn: 28.5% to 50%,
Al: 0.3% to 12%,
La: 0% to 3.5%,
Ce: 0% to 3.5%,
Y: 0% to 3.5%,
Ca: 0% to 3.5%,
Sr: 0% to 0.5%,
Si: 0% to 0.5%,
Ti: 0% to 0.5%,
Cr: 0% to 0.5%,
Fe: 0% to 2%,
Co: 0% to 0.5%,
Ni: 0% to 0.5%,
V: 0% to 0.5%,
Nb: 0% to 0.5%,
Cu: 0% to 0.5%,
Sn: 0% to 0.5%,
Mn: 0% to 0.2%,
Sb: 0% to 0.5%,
Pb: 0% to 0.5%, and
the balance: Mg and impurities, and
the plating layer includes, in order from the steel sheet side,
a first plating layer which is composed of a structure containing an MgZn phase, an Mg phase, and a quasicrystal phase, and
a second plating layer which is positioned on the first plating layer and is composed of a structure containing an $Mg_{51}Zn_{20}$ phase, a Zn phase, and a quasicrystal phase.

2. The quasicrystal-containing plated steel sheet according to claim 1,
wherein a chemical composition of the plating layer contains, in atom %,
Zn: 32% to 40%,
Al: 2% to 5%,
Ca: 1% to 2.5%, and
the balance: Mg and impurities,
the chemical composition satisfies
atomic ratio Zn/Al=7.5 to 18 and
atomic ratio Ca/Al=0.4 to 1.1, and
a maximum grain size of the second plating layer is 1 μm or less in terms of circle equivalent diameter.

3. The quasicrystal-containing plated steel sheet according to claim 1,
wherein when the plating layer is viewed in a cross section in which a sheet thickness direction and a cutting direction are parallel to each other,
the MgZn phase of the first plating layer is configured by crystal grains having a circle equivalent diameter of 1 μm or more, and
the quasicrystal phase of the first plating layer is configured by a structure grown in the thickness direction of the plating layer.

4. The quasicrystal-containing plated steel sheet according to claim 1, wherein when the plating layer is viewed in a cross section in which a sheet thickness direction and a cutting direction are parallel to each other,
an area of a structure in which the maximum grain size of the second plating layer is 1 μm or less in terms of circle equivalent diameter is 90% or more with respect to a cross-sectional area of the entire second plating layer.

5. The quasicrystal-containing plated steel sheet according to claim 1, wherein when the plating layer is viewed in a cross section in which a sheet thickness direction and a cutting direction are parallel to each other, an area of the MgZn phase of the first plating layer is 10% to 70% with respect to a cross-sectional area of the entire first plating layer.

6. The quasicrystal-containing plated steel sheet according to claim 1, wherein the second plating layer does not contain an Mg phase.

7. The quasicrystal-containing plated steel sheet according to claim 1, wherein an average value of Vickers hardness measured at 10 gf of the second plating layer is 250 to 350 Hv.

8. The quasicrystal-containing plated steel sheet according to claim 1,
wherein the alloy layer contains at least any of $Fe_5Al_2$ and $Al_{3.2}Fe$ as the Al—Fe intermetallic compound, and
a thickness of the alloy layer is 10 nm to 200 nm.

9. A method for producing the quasicrystal-containing plated steel sheet according to claim 1, the method comprising:
a plating step of disposing a plating alloy in a molten state on at least one surface of a steel sheet, a chemical composition of the plating alloy containing, in atom %,
Zn: 28.5% to 50%,
Al: 0.3% to 12%,
La: 0% to 3.5%,
Ce: 0% to 3.5%,
Y: 0% to 3.5%,
Ca: 0% to 3.5%,
Sr: 0% to 0.5%,
Si: 0% to 0.5%,
Ti: 0% to 0.5%,
Cr: 0% to 0.5%,
Fe: 0% to 2%,
Co: 0% to 0.5%,
Ni: 0% to 0.5%,
V: 0% to 0.5%,
Nb: 0% to 0.5%,
Cu: 0% to 0.5%,
Sn: 0% to 0.5%,
Mn: 0% to 0.2%,
Sb: 0% to 0.5%,
Pb: 0% to 0.5%, and
the balance: Mg and impurities;
a first cooling step of cooling the plating alloy in a molten state to a temperature range of 330° C. or lower at an average cooling rate of 10° C./sec or less to form a plating layer on the surface of the steel sheet;
a temperature increasing and holding step of increasing a temperature of the plating layer into a temperature range of 350° C. to 400° C. at a temperature increasing rate range of 10 to 50° C./sec after the first cooling step and holding the temperature for 5 to 30 seconds; and
a second cooling step of cooling the plating layer at a cooling rate of 20° C./sec or more after the temperature increasing and holding step.

10. The method for producing a quasicrystal-containing plated steel sheet according to claim 9,
wherein the plating step is performed by a hot-dip plating method, and
after the steel sheet is pulled up from a hot-dip plating bath, the first cooling step is continuously performed.

11. The method for producing a quasicrystal-containing plated steel sheet according to claim 9,
wherein a chemical composition of the plating alloy in a molten state contains, in atom %,
Zn: 32% to 40%,
Al: 2% to 5%,
Ca: 1% to 2.5%, and
the balance: Mg and impurities, and
the chemical composition satisfies
atomic ratio Zn/Al=7.5 to 18 and
atomic ratio Ca/Al=0.4 to 1.1.

* * * * *